(12) United States Patent
Sakakibara et al.

(10) Patent No.: US 12,196,563 B2
(45) Date of Patent: Jan. 14, 2025

(54) INFORMATION PROCESSING APPARATUS, INFORMATION PROCESSING METHOD, INFORMATION PROCESSING SYSTEM AND NON-TRANSITORY COMPUTER READABLE MEDIUM

(71) Applicant: KABUSHIKI KAISHA TOSHIBA, Tokyo (JP)

(72) Inventors: Shizu Sakakibara, Kawasaki Kanagawa (JP); Hideyuki Aisu, Kawasaki Kanagawa (JP); Michio Yamashita, Tokyo (JP); Yoshikazu Yamane, Tokyo (JP); Noriyuki Hirayama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 17/196,510

(22) Filed: Mar. 9, 2021

(65) Prior Publication Data

US 2021/0364304 A1 Nov. 25, 2021

(30) Foreign Application Priority Data

May 22, 2020 (JP) .................................. 2020-089945

(51) Int. Cl.
*G01C 21/34* (2006.01)

(52) U.S. Cl.
CPC ..... *G01C 21/3453* (2013.01); *G01C 21/3446* (2013.01)

(58) Field of Classification Search
CPC ............. B60W 30/0956; B60W 30/09; B60W 2554/00; B60W 10/20; B60W 10/18;
(Continued)

(56) References Cited

U.S. PATENT DOCUMENTS 5,038,290 A 8/1991 Minami
5,625,559 A 4/1997 Egawa
(Continued)

FOREIGN PATENT DOCUMENTS

JP H7-19177 B2 3/1995
JP 2953282 B2 9/1999
(Continued)

OTHER PUBLICATIONS

S. Yin, et al. "Path Planning of Multiple AGVs Using a Time-space Network Model," IEEE, 34th Youth Academic Annual Conference of Chinese Association of Automation (YAC), Jinzhou, China, pp. 73-78 (2019).

*Primary Examiner* — Adam R Mott
*Assistant Examiner* — Alyzia N Dilworth
(74) *Attorney, Agent, or Firm* — Finnegan, Henderson, Farabow, Garrett & Dunner, LLP

(57) ABSTRACT

According to one embodiment, an information processing apparatus includes: a weight determiner configured to determine weights of a plurality of travel paths in a travel path network based on timings at which a first moving object travels on travel paths included in a first route among the plurality of travel paths; and a route creator configured to create a second route on which a second moving object travels in the travel path network based on the weights of the plurality of travel paths.

9 Claims, 24 Drawing Sheets

(58) Field of Classification Search
CPC ......... B60W 2556/50; B60W 60/0011; B60W 60/0027; B60W 50/0097; B60W 2420/52; B60W 2554/4042; B60W 10/06; B60W 2554/4041; B60W 60/0015; B60W 2420/42; B60W 2554/4029; B60W 30/0953; B60W 40/04; B60W 2520/10; B60W 30/095; B60W 60/00274; B60W 60/001; B60W 60/00276; B60W 30/18154; B60W 40/09; B60W 2554/80; B60W 30/08; B60W 60/00272; B60W 10/04; B60W 2050/146; B60W 30/143; B60W 2554/4045; G06V 20/58; G06V 20/56; G06V 10/764; G06V 10/82; G06V 20/588; G06V 20/64; G06V 40/20; G05D 1/0088; G05D 2201/0213; G05D 1/0214; G05D 1/0221; G05D 1/0212; G05D 1/0246; G05D 1/0231; G05D 1/0248; G05D 2201/0212; G05D 1/0223; G05D 1/0257; G05D 1/0027; G05D 1/024; G05D 1/0055; G05D 1/0289; G05D 2201/0216; G05D 1/0297; G05D 2201/0207; G05D 1/0274; G05D 1/0287; G05D 1/0225; G05D 1/0291; G08G 1/166; G08G 1/163; G08G 1/096791; G08G 1/164; G08G 1/0112; G08G 1/096725; G08G 1/0133; G08G 1/16; G08G 1/162; G08G 1/096827; G08G 1/096844; G01C 21/3453; G01C 21/3446; G01C 21/206; G01C 21/005; G01C 21/20; G01C 21/343; H04W 4/44

See application file for complete search history.

(56) References Cited

U.S. PATENT DOCUMENTS

| | | | |
|---|---|---|---|
| 7,873,469 | B2 | 1/2011 | D'Andrea et al. |
| 7,920,962 | B2 | 4/2011 | D'Andrea et al. |
| 8,068,978 | B2 | 11/2011 | D'Andrea et al. |
| 9,811,090 | B2 | 11/2017 | Yoneda |
| 10,446,029 | B2 | 10/2019 | Hoffman et al. |
| 11,023,421 | B1* | 6/2021 | Timmons ............ G01C 21/3446 |
| 2018/0173242 | A1* | 6/2018 | Lalonde ................ G05D 1/0217 |
| 2020/0117220 | A1* | 4/2020 | Paglieroni ............. B64C 39/024 |
| 2020/0293063 | A1 | 9/2020 | Aisu |
| 2021/0293548 | A1* | 9/2021 | Sørensen ............. G01C 21/206 |

FOREIGN PATENT DOCUMENTS

| | | |
|---|---|---|
| JP | 3364021 B2 | 1/2003 |
| JP | 2003-337623 A | 11/2003 |
| JP | 2009-277180 A | 11/2009 |
| JP | 5743169 B2 | 7/2015 |
| JP | 6370487 B2 | 8/2018 |
| JP | 2020-149370 A | 9/2020 |

* cited by examiner

INFORMATION PROCESSING APPARATUS, INFORMATION PROCESSING METHOD, INFORMATION PROCESSING SYSTEM AND NON-TRANSITORY COMPUTER READABLE MEDIUM

CROSS REFERENCE TO RELATED APPLICATIONS

This application is based upon and claims the benefit of priority from the prior Japanese Patent Application No. 2020-089945, filed on May 22, 2020, the entire contents of which are incorporated herein by reference.

FIELD

Embodiments described herein relate to an information processing apparatus, information processing method, information processing system and computer program.

BACKGROUND

In a system where a plurality of moving objects travel at the same time, the efficiency of the whole system decreases due to congestion and collision between the moving objects. A method is needed for creating routes that allow a plurality of moving objects to travel in an efficient way.

DETAILED DESCRIPTION

Figure 1:
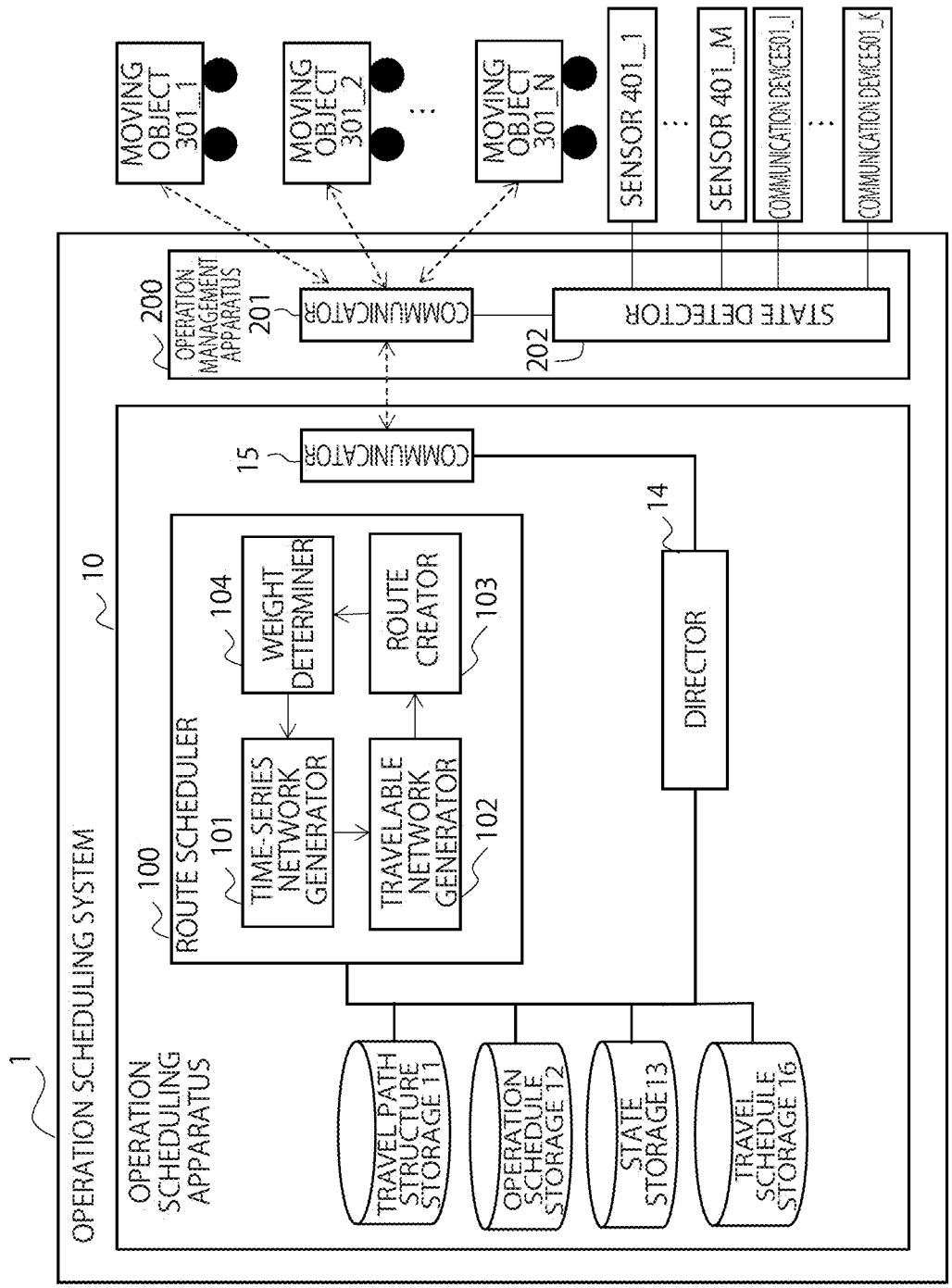
FIG. 1 illustrates an exemplary configuration of an operation scheduling system according to a first embodiment.

According to one embodiment, an information processing apparatus includes: a weight determiner configured to determine weights of a plurality of travel paths in a travel path network based on timings at which a first moving object travels on travel paths included in a first route among the plurality of travel paths; and a route creator configured to create a second route on which a second moving object travels in the travel path network based on the weights of the plurality of travel paths.

Below, the technological background of the embodiments will be described. In recent years, manufacturing of a wide variety of products in small quantities has become common, and accordingly production processes need to be flexible. For example, respective processes of a production line are modularized and freely rearranged, and deliveries between the processes are made using automatic guided vehicles (AGVs). For another example, mobile robots having a working arm are used, which can travel and work across a plurality of work sites.

Because of an acute shortage of frontline workers in logistics, more and more labor-saving efforts are made in logistics centers for online shopping. This problem may be addressed, for example, by combining AGVs, self-driving forklifts and picking robots.

With the advance of the self-driving technology for automobiles, automated valet parking, in which unmanned automobiles drive and park themselves in a parking space, has reached a practical level. Techniques to drive unmanned construction machine moving objects by remote control in a construction site or mining site have also reached a practical level.

For autonomous moving objects that identify their own positions while they are traveling, it is difficult to manage their travel strictly based on traveling time and therefore the moving objects may unexpectedly travel in opposite directions somewhere on a free plane. This may cause deadlock depending on the structure of travel paths.

In order to efficiently control travel of many self-driving moving objects in a narrow area, it is necessary to prevent contention such as collision and deadlock between the moving objects. This is conventionally addressed by providing double-track travel paths that allow moving objects to travel simultaneously in opposite directions, a plurality of unidirectional loops, or dedicated grid-like travel paths or traveling spaces.

Given the use of such dedicated travel paths, in one related art, schedules are made so that any moving objects will not travel in opposite directions on any routes of the moving objects. In a case where existing paths for human workers are diverted in stages to self-driving moving objects, however, it could be inevitable to use travel paths having an arrangement that can cause travel in opposite directions on the same travel path, or for safety reasons, it could be inevitable to specify travel paths that can cause travel in opposite directions. Thus, a versatile system is needed, which can make operation schedules even in such cases. The aforementioned related art cannot be applied in these conditions.

In another related art, a travel schedule is made for each moving object (each moving object is reserved) in turn. A travel schedule for a moving object is made so that the moving object and any of the previously reserved moving objects will not travel in opposite directions. A problem with this related art is that the efficiency of travel of moving objects varies significantly depending on the order of reservations of the moving objects, which results in a decrease in the efficiency of the whole system.

The use of dedicated travel paths requires extra construction costs and makes it difficult to change the layout of the travel paths in stages after the start of operation.

One of the techniques to solve this problem is to predict an occurrence of contention such as collision and deadlock between moving objects, and if contention is predicted to occur, create schedules such that one of the contending moving objects is kept waiting to prevent the contention. In this technique, a plurality of moving objects may be kept waiting before the same node (intersection of travel paths) for a long time, which again leads to a decrease in the efficiency of the whole system.

Another technique to solve the problem is to indicate where each moving object is in each time range by way of a network called "time-series network", and create travel schedules such that multiple moving objects cannot be at the same place in the same time range. In this technique, the route of each moving object is optimized by dividing the schedule period into multiple time ranges having the same length and calculating the states of all moving objects in each time range. Consequently, the size of a travel path network, the length of a schedule period and the granularity of time ranges are limited for practical use. In addition, if travel schedules for a plurality of moving objects are created only for a short period of time from the start of the schedule period, the schedules may cause the moving objects to be concentrated and stuck in a portion of a network.

The embodiments of the present invention enable efficient travel of a plurality of moving objects such as AGVs and mobile robots by preventing contention such as collision and deadlock between the moving objects when the moving objects travel at the same time. A moving object according to the embodiments may be an autonomous moving object that identify its own position while it is traveling on a free plane, or a non-autonomous moving object that travels on dedicated travel paths such as laid rails or guide tapes. The embodiments will be described in detail below.

The embodiments will be described with reference to the accompanying drawings.

First Embodiment

FIG. 1 illustrates an exemplary configuration of an operation scheduling system according to a first embodiment. The operation scheduling system 1 in FIG. 1 includes an operation scheduling apparatus 10, which is an information processing apparatus, and an operation management apparatus 200. The operation scheduling apparatus 10 creates travel schedules for moving objects 303_1-303N and manages travel of the moving objects 303_1-303N based on the created travel schedules. The moving objects 303_1-303N may be automatically travelable moving objects such as automatic guided vehicles (AGVs), autonomous mobile robots and self-driving vehicles (e.g., self-driving cars). Any of the moving objects 303_1-303N is hereinafter referred to as a moving object 303.

The moving objects 303 travels in a travel path network including a plurality of travel paths on which the moving objects can travel. The travel path network is composed of a plurality of travel paths that are connected to each other. A connection point of travel paths represents an intersection of travel paths where a moving object can change travel paths. An end of a travel path which is not connected to an intersection is a dead end. A specific example of the travel path network will be described below with reference to FIG. 2. The travel path network is deployed, for example, in a plant, warehouse or facility premises. The moving objects 303 may have a battery and travel and operate on electric power stored in the battery. The moving objects can travel forward and may also be able to travel backward. The moving objects may travel by steering control or may be rotatable to reverse its direction. The moving objects may travel in a direction other than the forward and backward directions, for example, a diagonal direction.

The travel path network includes sensors 401_1-401_M that detect the states of the moving objects 303 and communication devices 501_1-501K that can communicate with the moving objects 303. Any of the sensors 401_1-401_M is hereinafter referred to as a sensor 401. Any of the communication devices 501_1-501K is hereinafter referred to as a communication device 501. The sensors 401 and the communication devices 501 are located along travel paths, at ends of travel paths, at points where travel paths cross (intersections), or any other points in the travel path network.

Figure 2:
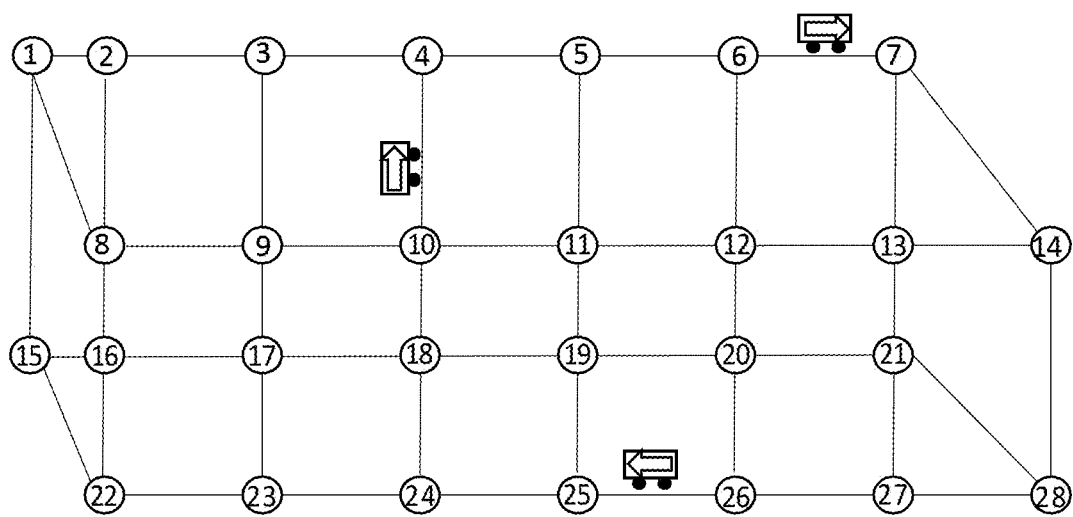
FIG. 2 is a schematic diagram illustrating an exemplary travel path network.

FIG. 2 is a schematic diagram illustrating an exemplary travel path network. In FIG. 2, a circle represents a point where travel paths cross (intersection) or an end of a travel path, and the number in the circle is the identifier of the intersection or the end. A line connecting circles represents a travel path between two intersections, on which moving objects can travel. Moving objects are traveling in a direction of arrow between intersections 6 and 7, between intersections 4 and 10 and between intersections 25 and 26, respectively.

In the example in FIG. 2, each travel path is straight but it may be curved or include both a straight portion and a curved portion. The travel paths may be built with guide tapes. Markers may be deployed at key points on the travel paths for the moving objects to determine which travel paths they take, or the moving objects may detect their own positions and identify virtual travel paths.

The number of moving objects that can travel on a travel path (i.e., the number of lanes) may be predetermined. For example, if the number of moving objects is one, two moving objects cannot travel in opposite directions at the same time (i.e., cannot pass each other) on the travel path, or a moving object cannot overtake another moving object on the travel path when those moving objects are traveling in the same direction. If the number of moving objects is two, two moving objects can travel in opposite directions at the same time (i.e., can pass each other) on the travel path, or a moving object can overtake another moving object on the travel path. Although the present embodiment is described in reference to travel paths on which two moving objects cannot pass each other or a moving object cannot overtake another moving object, the present embodiment can be applied to any types of travel paths. When two moving objects travel in opposite directions or collide with each other on such a travel path, contention occurs. If the moving objects is travelable both forward and backward or rotatable to change their directions, contention can be solved by one of the two moving objects traveling back along the same travel path. If both the two moving objects is travelable only in the forward direction and is not rotatable, contention cannot be solved. Even when contention is solvable, solving contention is time-consuming. Thus, it is desirable that a travel schedule for each moving object causes as little contention as possible.

A graph representation of a travel path network such as that depicted in FIG. 2 is referred to as travel path structure information. Travel path structure information can be generated by generating nodes corresponding to intersections or ends, arcs corresponding to travel paths between intersections and between intersections and ends, and connecting the nodes by the arcs.

Figure 3:
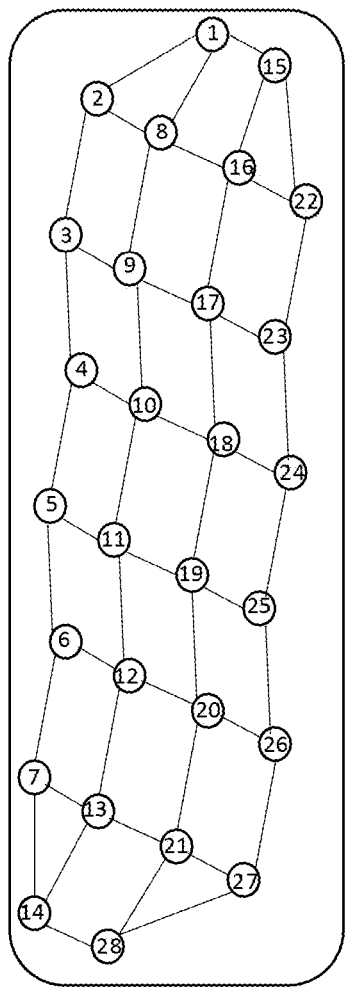
FIG. 3 illustrates exemplary travel path structure information generated based on the travel path network shown in FIG. 2.

FIG. 3 illustrates exemplary travel path structure information generated based on the travel path network shown in FIG. 2. A circle represents a node and the number in the circle is the identifier of the node. Although the identifier of a node is the same as the identifier of the intersection corresponding to the node, those identifiers may be different as long as the correspondence between them can be determined.

A node has node information including a node ID, an x-coordinate, a y-coordinate and a node type (intersection, end, etc.). An arc has arc information including the node ID of one of the two nodes at both ends of the arc and the node ID of the other node.

A travel path structure storage 11 stores travel path structure information generated based on the travel path network. The travel path structure information may include the coordinates of a plurality of nodes and a plurality of arcs connecting the plurality of nodes, for example.

An operation schedule storage 12 stores operation schedules including points of departure and points of arrival for a plurality of moving objects. The operation schedule storage 12 may store times of departure and points through which moving objects have to travel. If moving objects have tasks to be performed on the way to their points of arrival, the operation schedule storage 12 may also store information on what the moving objects have to do for the tasks and where the moving objects have to perform the tasks.

A state storage 13 stores the state of each moving object. The state of a moving object includes whether the moving object is carrying loads or not, the position, velocity, traveling direction on a travel path and remaining battery power of the moving object. The state of a moving object may also include information on specifications such as the standard velocity, maximum velocity, minimum velocity, size, travelable directions of the moving object. The state of a moving object may be obtained by a communicator 201 of the operation management apparatus 200 communicating with the moving object, or by a state detector 202 of the operation management apparatus 200 from the moving object via at least one of the sensors 401 and the communication devices 501. When the moving object is out of the communication range of the communicator 201, the moving object notifies its state to the operation scheduling apparatus 10 via the sensors 401 or the communication devices 501 located along travel paths or at intersections.

A travel schedule storage 16 stores a travel schedule for each moving object created by a route scheduler 100 that is described below. The travel schedule includes the point of departure and the point of arrival of the moving object, points through which the moving object has to travel and a timing at which the moving object travels through each of those points (at least one of the arrival time, departure time and passage time). The route scheduler 100 creates a travel schedule for each moving object by first creating a route for the moving object and then determining a timing at which the moving object travels through each node (point) included in the route (at least one of the arrival time, departure time and passage time). One of the features of the present embodiment consists in a process of creating a route for each moving object by the route scheduler 100.

Based on the travel schedule for each moving object, a director 14 generates an instruction that instructs the moving object to travel according to the travel schedule. For example, the director 14 may generate an instruction that instructs each moving object to travel according to the travel schedule for the moving object. The director 14 provides the generated instruction to a communicator 15. For example, the instruction may include a sequence of commands that instruct the moving object to travel on travel paths (arcs) indicated by the travel schedule in sequence, but the instruction may be in any format. The instruction may include a command that specifies a traveling velocity on travel paths, or a command that specifies a task to be performed (e.g., putting loads on shelves located along travel paths or picking up loads from shelves). If the moving object is not at the point of departure before execution of the travel schedule, the director 14 may generate an instruction that instructs the moving object to move to the point of departure. The director 14 may generate an instruction that instruct each moving object to return the state of the moving object.

The communicator 15 is in wired or wireless communication with the operation management apparatus 200. The operation management apparatus 200 and the operation scheduling apparatus 10 may be included in the same apparatus. In this case, the communicator 15 may be integrated with the communicator 201 of the operation management apparatus 200. The communicator 15 transmits an instruction for a moving object to the communicator 201 of the operation management apparatus 200. The communicator 201 transmits the instruction for the moving object to the moving object by wired or wireless communication. The moving object travels according to the instruction received from the communicator 201. If contention occurs between the moving object and another moving object, the moving object may autonomously perform operations to solve the contention. For example, if two moving objects travel simultaneously in opposite directions on a travel path that do not allow such travel, one of the two moving objects may travel back along the same travel path and wait at the side of the entrance of the travel path.

The state detector 202 of the operation management apparatus 200 obtains information indicating the state of a moving object via at least one of the sensors 401 and the communication devices 501. The communicator 201 transmits the information indicating the state obtained by the state detector 202 to the communicator 15. The communicator 15 stores the received information indicating the state in the state storage 13. For example, the state of the moving object may be stored in the state storage 13, with the ID of the moving object and a timestamp associated with the state of the moving object.

The route scheduler 100 creates routes on which a plurality of moving objects travel. The route scheduler 100 creates a travel schedule for each of the moving objects by determining a timing at which the moving object travels through each node (point) included in the created route of the moving object (at least one of the arrival time, departure time and passage time). If the operation schedules of the moving objects include tasks to be performed by the moving objects, the tasks and timings of performing the tasks may be added to the travel schedules. If the operation schedules include tasks that can be performed by any moving objects, the tasks may be assigned to moving objects that arrive earliest at locations where the tasks are to be carried out.

The route scheduler 100 includes a time-series network generator 101, a travelable network generator 102, a route creator 103 and a weight determiner 104.

The time-series network generator 101 divides a period of time for which travel schedules are created into a plurality of times (time ranges) and generates a plurality of time-series networks corresponding to the plurality of times respectively based on the travel path structure information. The time-series networks corresponding to the respective times are generated, for example, by copying the travel path structure information. If the travel path structure does not change during the period for which travel schedules are created (in the present embodiment, this is assumed to be true), the time-series networks corresponding to the respective times respectively are the same. The generated time-series networks are in the initial state.

Figure 4:
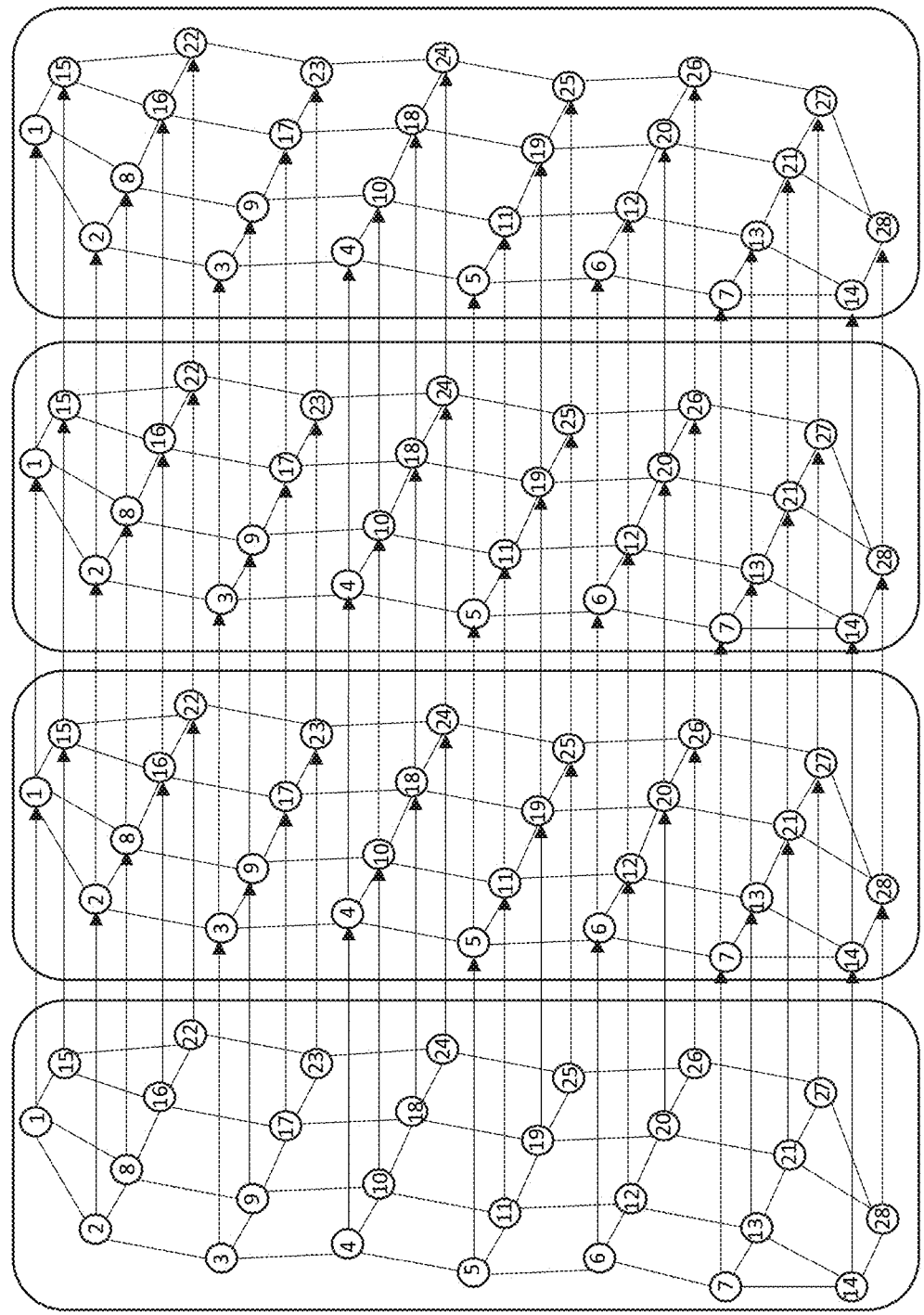
FIG. 4 illustrates a plurality of exemplary time-series networks generated by a time-series network generator.

FIG. 4 illustrates a plurality of exemplary time-series networks generated by the time-series network generator 101. In this example, time-series networks are shown, which are generated for the respective times (from 0 to 1 second, from 1 to 3 seconds, from 3 to 10 seconds and from 10 to 60 seconds) in a case where a travel schedule is created for a certain moving object (target moving object) for 60 seconds from the schedule start time.

The time lengths of the generated time-series networks vary (i.e., uneven) and become longer over time. The time lengths of the time-series networks may be specified by a user. A user may specify a time of particular interest and then finely adjust the length(s) of a time range or ranges after, before, or around the time. The time lengths of the time-series networks may be the same. In the example in FIG. 4, the time lengths of the time-series networks become longer over time to reduce the total number of time-series networks and thereby reduce computational complexity.

Figure 5:
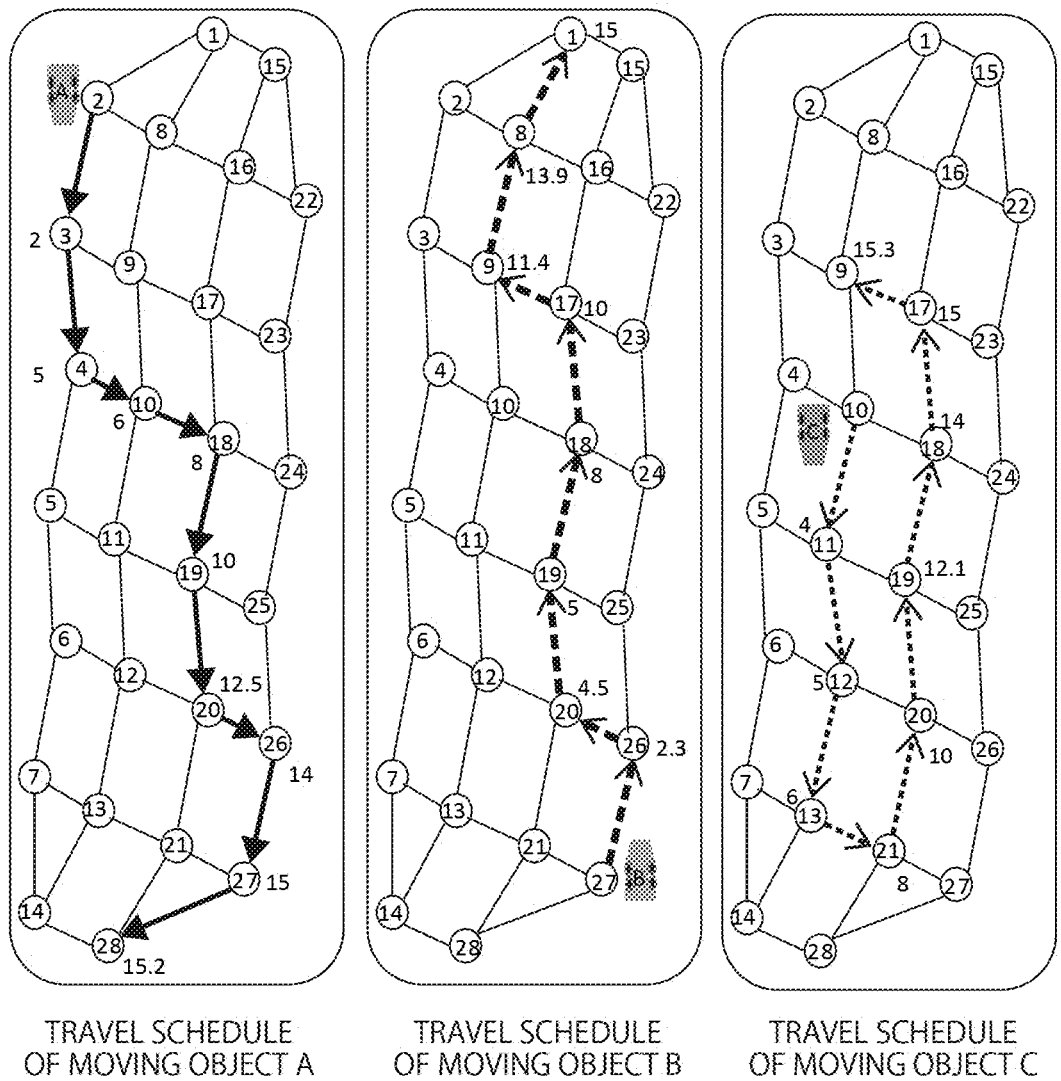
FIG. 5 illustrates an example in which travel schedules for moving objects other than a target moving object, which have been created before a travel schedule is created for the target moving object, are reflected on the travel path structure information.

In FIG. 5, travel schedules for moving objects A, B and C, which have been created before the travel schedule for the target moving object is created, are reflected (represented as graphs) on the travel path structure information. The route of each moving object and the arrival time (or passage time) at each node included in the route are shown. Although the start times of the schedules are the same for all the moving objects, the departure times of the moving objects from their points of departure do not need to be the same as the start times of the schedules. The travel schedules for the moving objects A, B and C have been created by the route scheduler 100 before the travel schedule for the target moving object is created. The travel schedules for the moving objects A, B and C may be created in a manner different from that described in the present embodiment (e.g., the travel schedules may be user-created).

In FIG. 5, the point of departure of the route for the moving object A is node 2 and the point of arrival is node 28. Similarly, the point of departure of the route for the moving object B is node 27 and the point of arrival is node 1. The point of departure of the route for the moving object C is node 10 and the point of arrival is node 9.

Suppose that moving objects D and E are target moving objects for which travel schedules are to be created next. The operation schedule specifies that the point of departure of the moving object D is node 8 and the point of arrival is node 21, but the route of the moving object D has not been determined. The operation schedule specifies that the point of departure of the moving object E is node 11 and the point of arrival is node 9, but the route of the moving object E has not been determined.

The travelable network generator 102 reflects the travel schedules of the moving objects A, B and C (see FIG. 5) on the time-series networks corresponding to the respective times (see FIG. 4). The time-series networks corresponding to the respective times on which the travel schedules of the moving objects A, B and C (first moving objects) are reflected constitute first information including travel paths on which the first moving objects travel for the plurality of times.

First, arcs are calculated, on which the moving objects A-C are to travel (exist) from 0 (the start time of the travel schedules) to 1 second. The moving object A is to travel on arc (2, 3), the moving object B is to travel on arc (27, 26), and the moving object C is to travel on arc (10, 11). Information indicating the calculated arcs is set to the time-series network corresponding to the time from 0 to 1 second.

Figure 6:
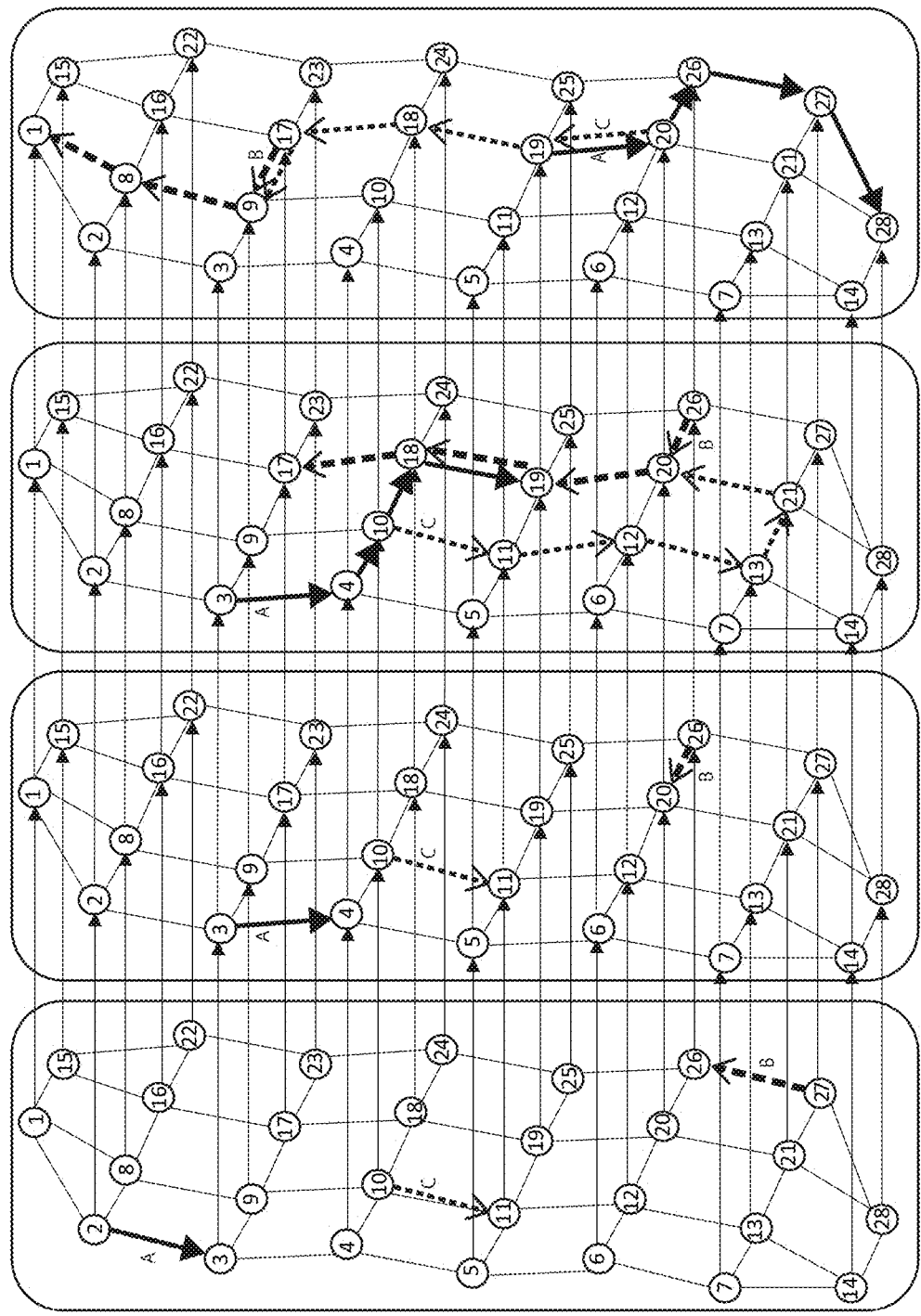
FIG. 6 illustrates exemplary time-series networks that show the ranges of travel by the other moving objects.

The leftmost graph in FIG. 6 illustrates an example in which information indicating arcs on which the moving objects A, B and C are to travel from 0 to 1 second is set to the time-series network corresponding to the time from 0 to 1 second.

The second graph from left in FIG. 6 illustrates an example in which information indicating arcs on which the moving objects A, B and C are to travel from 1 to 3 seconds is set to the time-series network corresponding to the time from 1 to 3 seconds.

The third graph from left in FIG. 6 illustrates an example in which information indicating arcs on which the moving objects A, B and C are to travel from 3 to 10 seconds is set to the time-series network corresponding to the time from 3 to 10 seconds.

The rightmost graph in FIG. 6 illustrates an example in which information indicating arcs on which the moving objects A, B and C are to travel from 10 to 60 seconds is set to the time-series network corresponding to the time from 10 to 60 seconds.

The travelable network generator 102 calculates ranges which the target moving object can reach (in which the target moving object can exist) in the time-series networks corresponding to the respective times in 60 seconds. In doing so, it is assumed that the target moving object travels at a velocity that is determined in a predetermined manner. For example, the velocity of the moving object may be assumed to be constant, or the velocity may be adjusted depending on the inclination of travel paths or the presence or absence of loads. The travelable network generator 102 sets information indicating the ranges which the target moving object can reach (in which the target moving object can exists), more specifically, information indicating arcs included in those ranges, to the time-series networks corresponding to the respective times. The time-series networks to which information indicating the ranges is set are referred to as travelable networks for the target moving object. The travelable networks corresponding to the plurality of times constitute first information including travel paths which the target moving object can reach in the plurality of times.

This will be described in more detail on the assumption that the moving object D is the target moving object. A range in each time-series network which the moving object D can start from the node 8 and reach (in which the moving object D can exist) within 60 seconds is calculated.

In the time-series network corresponding to the time from 0 to 1 second, the moving object D can be at node 8 or on one of the four arcs connected to node 8. Information indicating the four arcs is, therefore, set to the time-series network corresponding to the time from 0 to 1 second. As a specific example of this calculation, Dijkstra's algorithm may be used to calculate the distance from the departure node to each node in the travel path network. Then, nodes which the moving object D can reach from 0 to 1 second are determined. Arcs to the determined nodes are regarded as reachable arcs of the moving object D.

Figure 7:
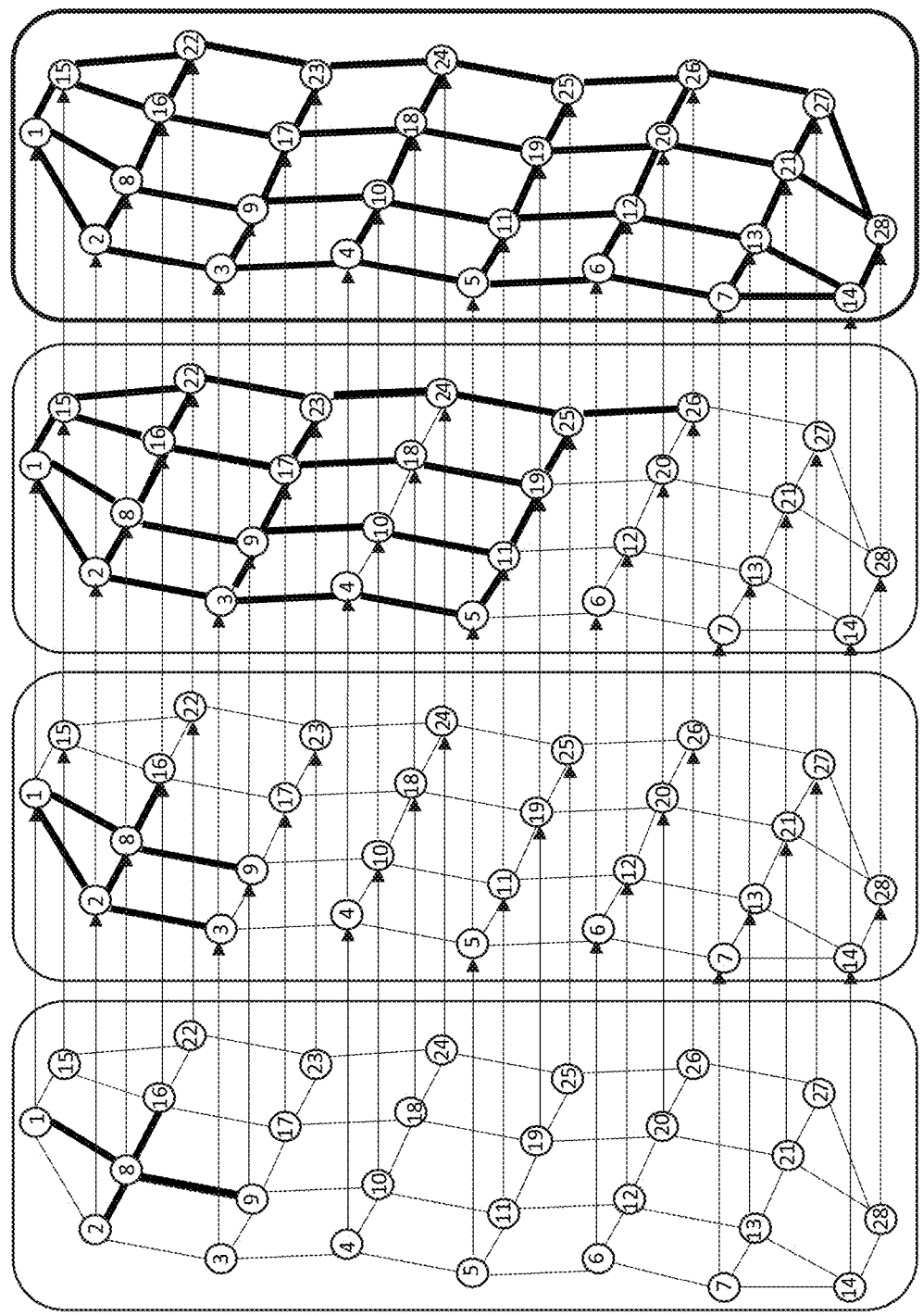
FIG. 7 illustrates an exemplary travelable networks to which information on ranges reachable by the target moving object is set.

The leftmost graph in FIG. 7 illustrates an exemplary travelable network in which information on a range where the moving object D can exist is set to the time-series network corresponding to the time from 0 to 1 second.

Next, in the time-series network corresponding to the time from 1 to 3 seconds, a range (range 2) is determined, in which the moving object D can move from the four arcs connected to node 8 in 2 seconds (from 1 to 3 seconds), in addition to the range (range 1) in which the moving object D can exist from 0 to 1 second. The moving object D can exist on arcs in the range 1 or range 2. As a specific example of this calculation, nodes which the moving object D can reach from the departure node from 0 to 3 seconds may be determined based on the distance to each node. Arcs to the determined nodes are regarded as reachable arcs of the moving object D.

The second graph from left in FIG. 7 illustrates an exemplary travelable network in which information on a range where the moving object D can exist is set to the time-series network corresponding to the time from 1 to 3 seconds.

In a similar manner, arcs on which the moving object D can exist are determined in the time-series network corresponding to the time from 3 to 10 seconds. As a specific example of this calculation, nodes which the moving object D can reach from the departure node from 0 to 10 seconds may be determined based on the distance to each node. Arcs to the determined nodes are regarded as reachable arcs for the moving object D.

The third graph from left in FIG. 7 illustrates an exemplary travelable network in which information on a range where the moving object D can exist is set to the time-series network corresponding to the time from 3 to 10 seconds.

Similarly, arcs on which the moving object D can exist are determined in the time-series network corresponding to the time from 10 to 60 seconds. As a specific example of this calculation, nodes which the moving object D can reach from the departure node from 0 to 60 seconds may be determined based on the distance to each node. Arcs to the determined nodes are regarded as reachable arcs for the moving object D.

The rightmost graph in FIG. 7 illustrates an exemplary travelable network in which information on a range where the moving object D can exist is set to the time-series network corresponding to the time from 10 to 60 seconds.

The route creator 103 creates a route for the target moving object base on the travelable networks corresponding to the respective times (first information including travel paths which the moving object can reach in the plurality of times) and the weights of travel paths in the travel path network corresponding to the respective times.

In particular, the route creator 103 obtains the weights of arcs included in ranges which the target moving object can reach (also referred to as first arcs) in the travelable networks corresponding to the respective times. The weights of the first arcs are preset in the time-series networks corresponding to the respective times. More specifically, the weights of arcs in the time-series networks corresponding to the respective times are determined (or updated) by the weight determiner 104 when routes are created for the moving objects A-C. For example, sufficiently large values are given to arcs included in the route of at least one of the moving objects A-C, and the minimum value (e.g., zero) is given to arcs that are not included in any routes of the moving objects A-C. If the routes of the moving objects A-C are determined differently from using the operation scheduling system, the weights of arcs may be set in any suitable manner.

Figure 8:
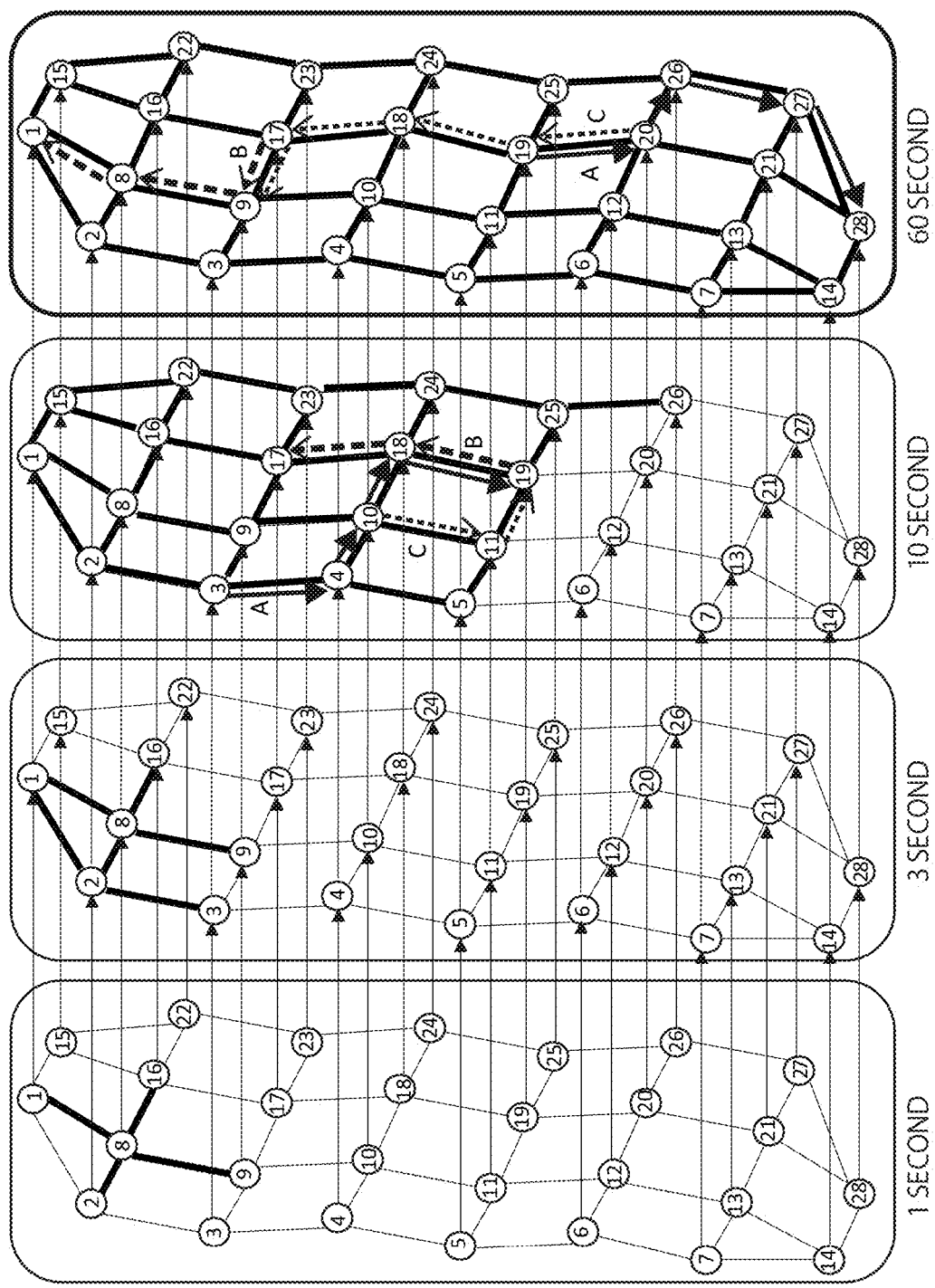
FIG. 8 schematically illustrates an example of obtaining the weights of arcs in the ranges reachable by the target moving object.

FIG. 8 schematically illustrates an example of obtaining the weights of arcs included in the ranges which the target moving object can reach (first arcs) in the travelable networks corresponding to the respective times. Arrows (indicating the routes of the moving objects A-C) are drawn along first arcs that are included in the routes of the moving objects A-C. The first arcs included in the route of at least one of the moving objects A-C have weights larger than the minimum value. First arcs that are not included in any routes of the moving objects A-C have the minimum weight. The travelable networks corresponding to the respective times in which the first arcs are associated with the obtained weights are referred to as "weighted travelable networks."

The leftmost graph in FIG. 8 illustrates the weighted travelable network corresponding to the time from 0 to 1 second. No first arc is included in the routes of the moving objects A-C and all the first arcs have the minimum weight.

The second graph from left in FIG. 8 illustrates the weighted travelable network corresponding to the time from 1 to 3 seconds. No first arc is included in the routes of the moving objects A-C and all the first arcs have the minimum weight.

The third graph from left in FIG. 8 illustrates the weighted travelable network corresponding to the time from 3 to 10 seconds. Some of the first arcs are included in the routes of the moving objects A-C and therefore have sufficiently large weights. All the other first arcs have the minimum weight.

The rightmost graph in FIG. 8 illustrates the weighted travelable network corresponding to the time from 10 to 60 seconds. Some of the first arcs are included in the routes of the moving objects A-C and therefore have sufficiently large weights. All the other first arcs have the minimum weight.

As can be seen from FIG. 8, the weights of the first arcs change according to time. For example, in the third graph from left in FIG. 8, arc (3, 4) has a sufficiently large weight, but in the fourth graph from left in FIG. 8, arc (3, 4) has the minimum weight.

The route creator 103 creates a route from the departure node to the arrival node for the target moving object based on the weighted travelable networks corresponding to the respective times. For example, the route creator 103 may search for the shortest weighted route by Dijkstra's algorithm. In this case, normalized weights are calculated by dividing the weights of the first arcs by the lengths of the travel paths corresponding to the first arcs respectively. The route creator 103 searches for a set of arcs (travel paths) from the departure node to the arrival node, the sum of the normalized weights of which is the smallest or smaller than a threshold. The route from the departure node to the arrival node via the found nodes and arcs between them is selected as a route for the target moving object. In this example, the weights of the first arcs are divided by the lengths but this may be omitted if the weights are reflective of the lengths. It is assumed that the target moving object travels at a velocity that is determined in a predetermined manner. The velocity of the moving object may be assumed to be constant, or the velocity may be adjusted depending on the inclination of travel paths or the presence or absence of loads. A timing (the departure time, passage time or arrival time) is calculated, at which the target moving object travels through each node included in its route if the moving object travels at the determined velocity. A travel schedule is created by adding the timing at which the target moving object travels through each node to the route of the target moving object. The created travel schedule for the target moving object is stored in the travel schedule storage 16.

Figure 9:
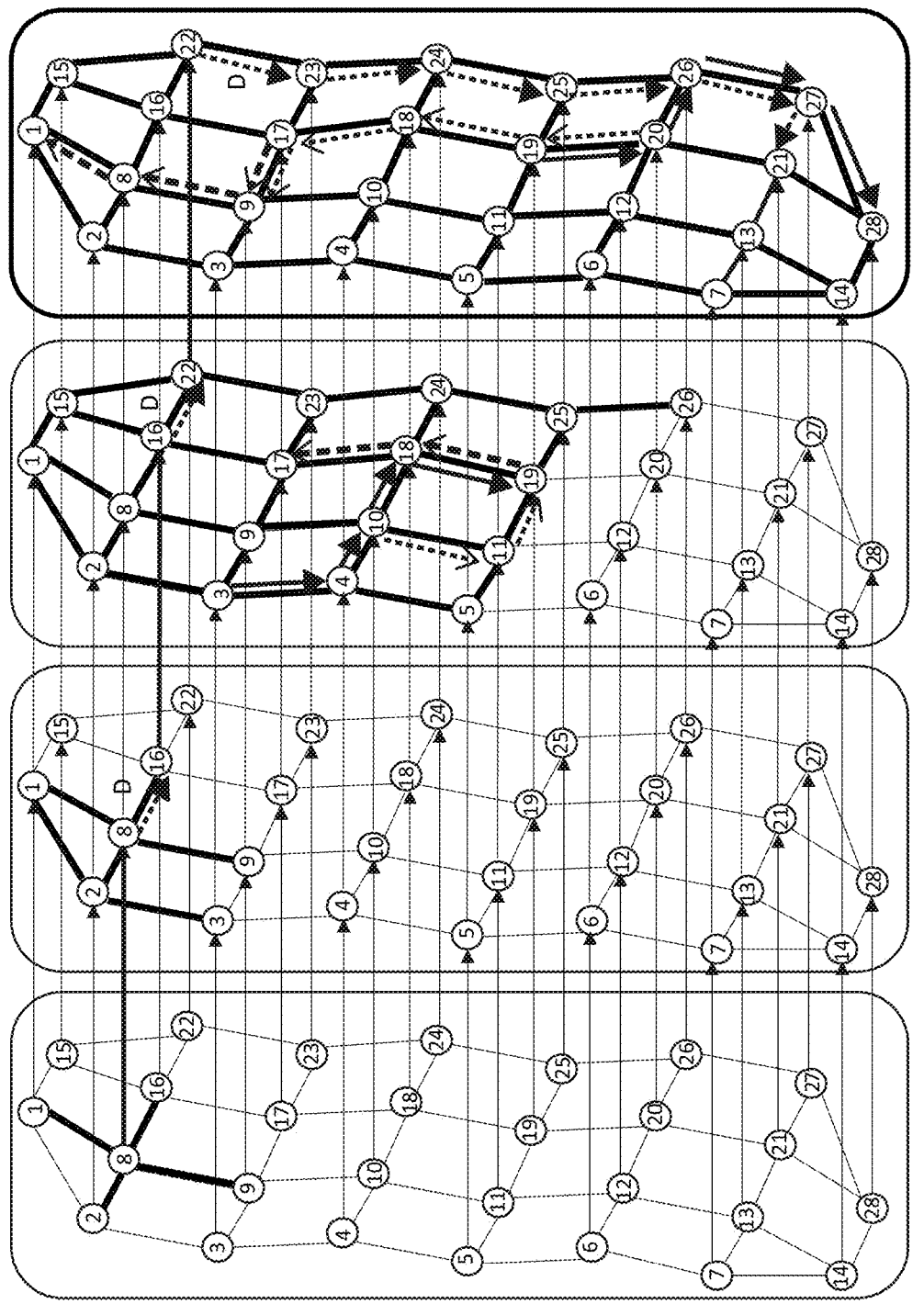
FIG. 9 illustrates an exemplary route created for the target moving object.

FIG. 9 illustrates an exemplary route created for the target moving object (at this point, the moving object D) by the route creator 103. In the travelable networks corresponding to the respective times, the route created for the target moving object is indicated by "D."

The weight determiner 104 sets the weight of each arc included in the route created for the moving object D for the respective times. For example, the weight determiner 104 assigns, as a weight to arcs included in the route of the moving object D, a fixed value sufficiently larger than the maximum value of an objective function (e.g., the objective function of Dijkstra's algorithm). If an arc included in the route of the moving object D is also included in a route previously calculated for another moving object, the weight of the arc already has a large value and therefore may not be changed. In this way, the weight determiner 104 determines the weights of a plurality of travel paths in the travel path network based on timings at which the moving object D travels on travel paths (arcs) included in the route of the moving object D. In other words, the weight determiner 104 determines, based on timings at which the moving object D travels on travel paths, the weights of the plurality of travel paths for selecting travel paths on which the next target moving object, i.e., the moving object E, is to travel when a route for the moving object E is subsequently created.

As it is closer to the schedule start time (0 seconds), larger weights may be assigned to arcs. The weights of the arcs may be decreased over time. For example, if the moving object D is likely to travel on the travel path corresponding to a certain arc at the earliest time, the arc may be assigned a value sufficiently larger than the maximum value of the objective function to reduce the possibility of contention with the other moving objects. As time advances, however, the operation of the moving object D may be deviating from its travel schedule (e.g., an obstacle on a travel path causes delay of travel), or additional tasks may be assigned to the moving object D. Accordingly, as time passes, the moving object D is less likely to travel on the travel path, and therefore the weight of the arc may be decreased. Consequently, the weight may fall below the maximum value of the objective function.

In this manner, by increasing the weights of arcs at the earliest time and decreasing them over time, it is possible to reduce contention that is highly likely to happen at the earliest time rather than making elaborate schedules for the distant future.

In the example described above, the weights of arcs included in the route created for the moving object D are set. Before that, the weights of arcs included in the routes of the moving objects A-C are set in a similar manner when the routes are created for the moving objects A-C. With an increase in the number of moving objects that move on the same arc at the same time, the weight of the arc may be increased. The weight of a travel path may be set to a value sufficiently larger than the maximum value of the objective function regardless of the number of moving objects that travel on the travel path as long as at least one moving object travels on the travel path (this is the case with the aforementioned example).

Figure 10:
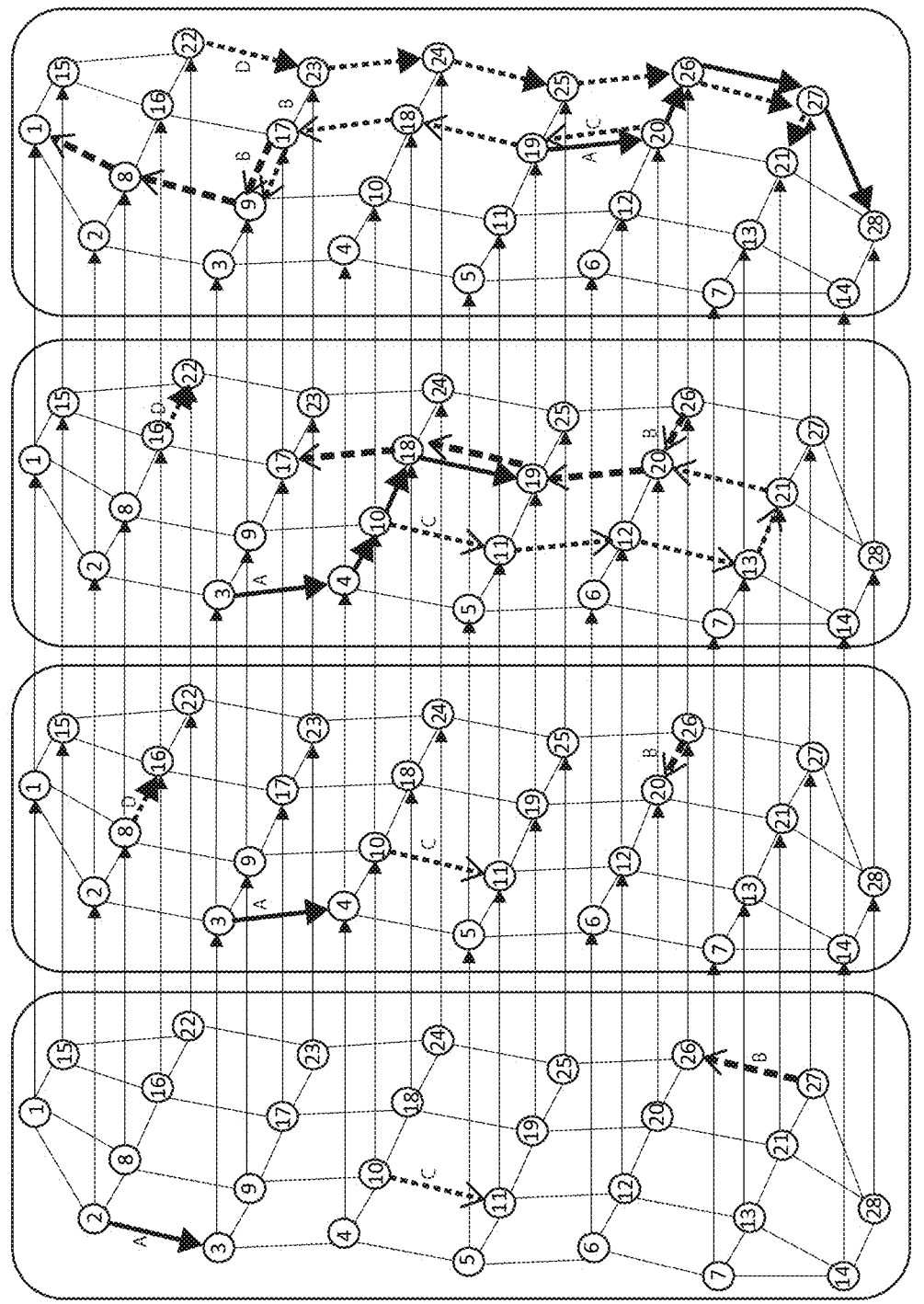
FIG. 10 illustrates a plurality of time-series networks generated by the time-series network generator.
Figure 11:
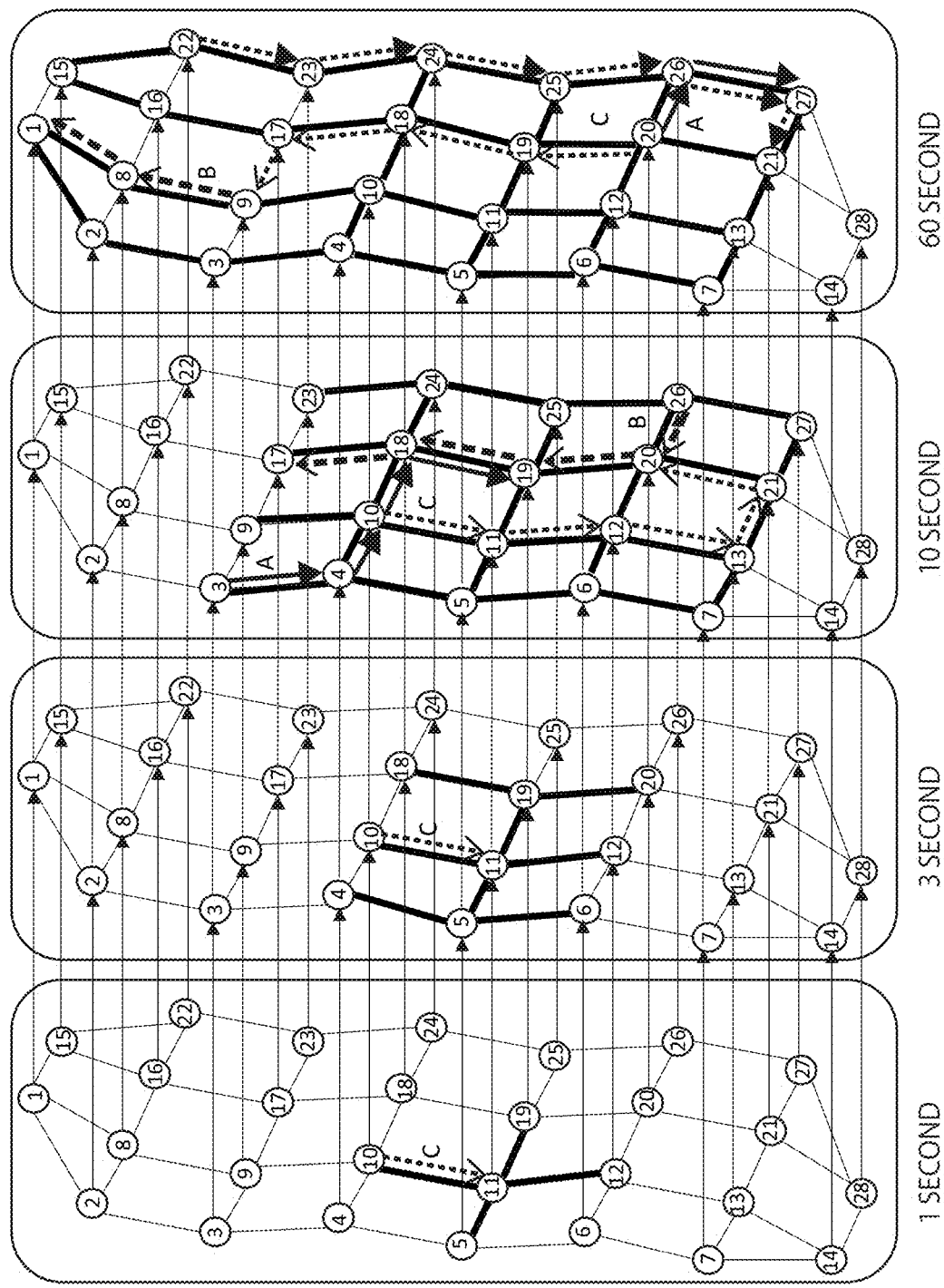
FIG. 11 illustrates an example of obtaining the weights of arcs included in the ranges reachable by the next target moving object.
Figure 12:
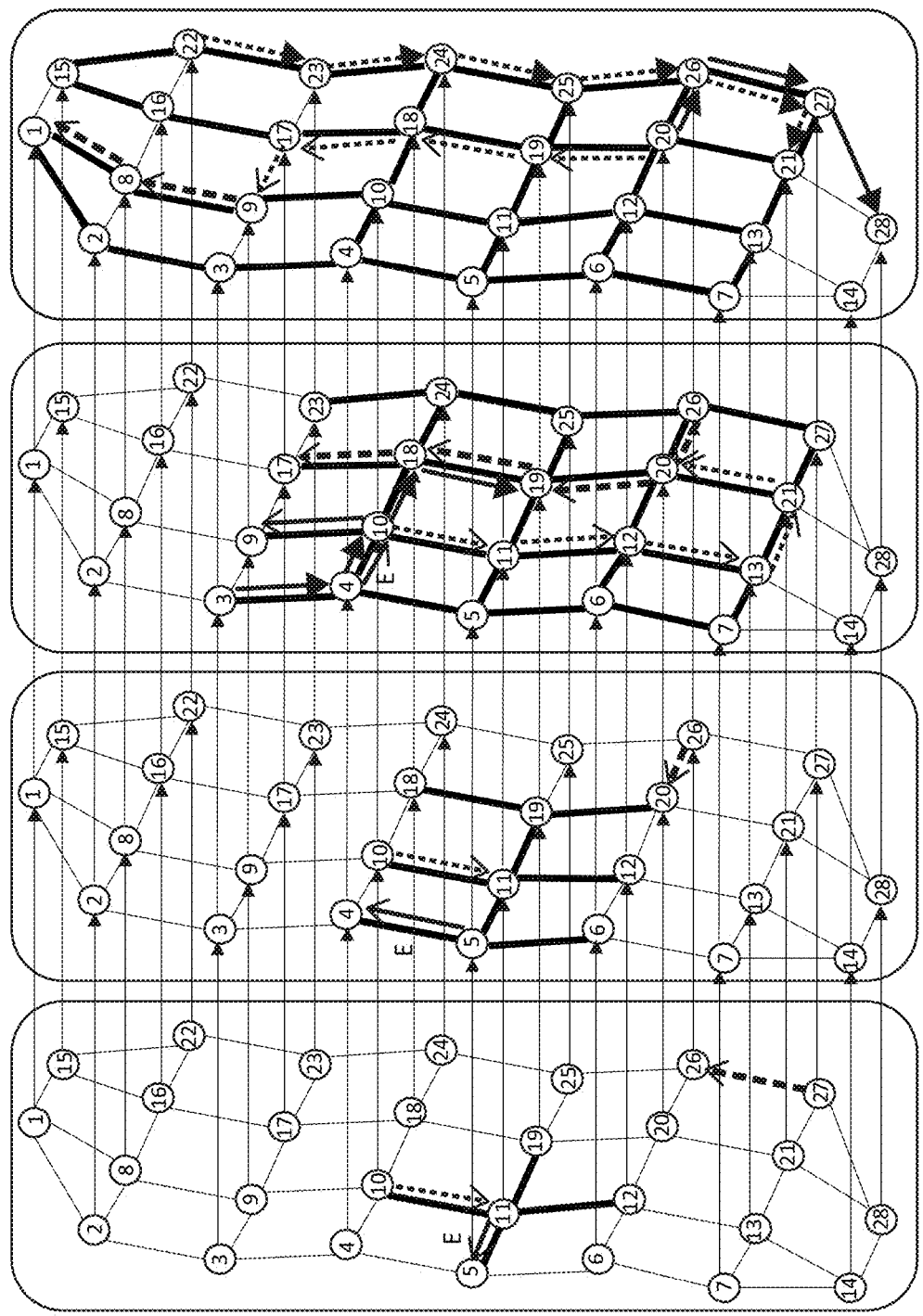
FIG. 12 illustrates an exemplary route created for the next target moving object.

FIGS. 10-12 illustrate exemplary data output from the time-series network generator 101, the travelable network generator 102 and the route creator 103 when a route for the moving object E is created subsequent to the creation of the route of the moving object D.

FIG. 10 illustrates an example in which information indicating arcs on which the moving objects A-D are to travel is set to the time-series networks corresponding to the respective times created by the time-series network generator 101.

The leftmost graph in FIG. 10 illustrates an example in which information indicating arcs on which the moving objects A-D are to travel from 0 to 1 second is set to the time-series network corresponding to the time from 0 to 1 second (note that the moving object D is at its departure node).

The second graph from left in FIG. 10 illustrates an example in which information indicating arcs on which the moving objects A-D are to travel from 1 to 3 seconds is set to the time-series network corresponding to the time from 1 to 3 seconds.

The third graph from left in FIG. 10 illustrates an example in which information indicating arcs on which the moving objects A-D are to travel from 3 to 10 seconds is set to the time-series network corresponding to the time from 3 to 10 seconds.

The rightmost graph in FIG. 10 illustrates an example in which information indicating arcs on which the moving objects A-D are to travel from 10 to 60 seconds is set to the time-series network corresponding to the time from 10 to 60 seconds.

FIG. 11 illustrates exemplary weighted travelable networks corresponding to the respective times for the moving object E. In particular, in FIG. 11, ranges which the moving object E can reach (in which the moving object E can exist) are set in the travelable networks corresponding to the respective times. Weights for arcs included in the ranges (first arcs) are determined and associated with the first arcs (the values of the weights are not shown). Arrows are drawn along first arcs included in the route of at least one of the moving objects A-D to indicate the route. The first arcs included in the route of at least one of the moving objects A-D have sufficiently large weights. First arcs that are not included in any routes of the moving objects A-D have the minimum weight. The leftmost graph in FIG. 11 illustrates the weighted travelable network corresponding to the time from 0 to 1 second. The second graph from left in FIG. 11 illustrates the weighted travelable network corresponding to the time from 1 to 3 seconds. The third graph from left in FIG. 11 illustrates the weighted travelable network corresponding to the time from 3 to 10 seconds. The rightmost graph in FIG. 11 illustrates the weighted travelable network corresponding to the time from 10 to 60 seconds.

FIG. 12 illustrates an exemplary route created for the target moving object (at this point, the moving object E) by the route creator 103. The route on which the target moving object E travels is indicated in the travelable networks corresponding to the respective times. The route on which the moving object E travels is indicated by "E."

In the example described above, routes are created for the moving objects D and E. Before that, routes for the moving objects A, B and C are created in this order. An additional description is given of how to create a route for the first target moving object, i.e., the moving object A. When a route is created for the moving object A first, in the travel path structure information, the weights of arcs may be set by default to values that depend on the lengths of the travel paths corresponding to the arcs. The shortest route from the point of departure to the point of arrival is determined by searching for a route which has the minimum or quasi-minimum total weight and selected as the route of the moving object A. The weights of the arcs corresponding to travel paths included in the route of the moving object A are set. The setting may be carried out in a manner similar to that used to determine weights in the above examples. As a result, the weights of the arcs included in the route of the moving object A are set to values sufficiently larger than the maximum value of the objective function. The weights may be decreased over time. The weights of arcs that are not included in the route of the moving object A may be unchanged from the default values or set to the minimum value (although, in the above examples, the weights of arcs that are not included in the routes of the moving objects are set to the minimum value, the default values may be used instead of the minimum value if it is desirable to keep the default values). After the route of the moving object A and the weights of the arcs included in the route are set, routes for the moving objects B and C are created in sequence in a manner similar to that described above.

Figure 13:
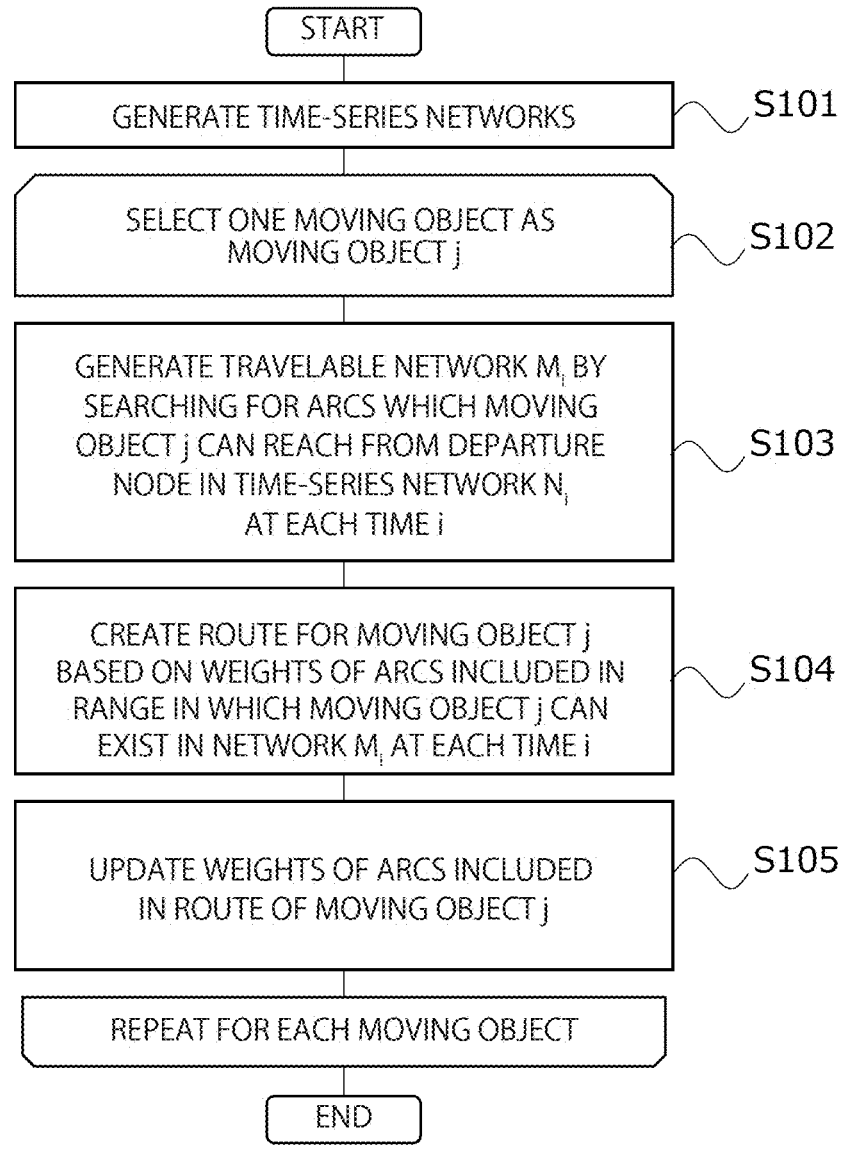
FIG. 13 is a flow chart illustrating exemplary operations of an operation scheduling apparatus according to the first embodiment.

FIG. 13 is a flow chart illustrating exemplary operations of the operation scheduling apparatus 10 according to the present embodiment.

In step S101, the time-series network generator 101 divides a period of time for which travel schedules are created into a plurality of times and generates a plurality of time-series networks corresponding to the plurality of times respectively based on travel path structure information. In the initial state, the time-series networks corresponding to the respective times are the same. The time lengths of the generated time-series networks may vary (or uneven).

In step S102, the travelable network generator 102 selects one moving object as the target moving object from a plurality of moving objects for which schedules are created (S102).

In step S103, the travelable network generator 102 reflects travel schedules previously created for other moving objects on the time-series networks corresponding to the respective times. The travelable network generator 102 calculates ranges which the target moving object can reach (in which the target moving object can exist) in the time-series networks corresponding to the respective times. Information indicating the ranges which the target moving object can reach, more particularly, information indicating arcs included in the ranges is set to the time-series networks corresponding to the respective times. The time-series networks to which information indicating the ranges is set represent travelable networks for the target moving object.

In step S104, the route creator 103 creates a route for the target moving object based on the weights of the arcs in the ranges which the target moving object can reach (also referred to as first arcs) in the travelable networks corresponding to the respective times.

In step S105, the weight determiner 104 updates the weights of arcs included in the route created for the target moving object. For example, the weight determiner 104 assigns, as a weight to the arcs included in the route of the moving object D, a fixed numerical value sufficiently larger than the maximum value of an objective function (e.g., the objective function of Dijkstra's algorithm). If another moving object, for which a route has been calculated, travels an arc included in the route of the moving object, the weight of the arc already has a large value.

Another moving object is selected as the next target moving object and steps S102-S105 are repeated.

In this way, according to the present embodiment, routes for a plurality of moving objects can be created with low computational complexity, which can reduce contention between the moving objects.

(Variation)

In the first embodiment, the point of departure and the point of arrival are given in an operation schedule for the target moving object. Additionally, waypoints may be given. Suppose that a waypoint 1 and a waypoint 2 are given to the target moving object as well as the point of departure and the point of arrival. In this case, first, a route from the point of departure to the waypoint 1 is calculated, then, a route from the waypoint 1 to the waypoint 2 is calculated, and finally, a route from the waypoint 2 to the point of arrival is calculated. More generally, a route from the point of departure to the point of arrival via waypoints 1–N (N is an integer equal to or more than 1) can be calculated in a similar manner.

Second Embodiment

In a second embodiment, the structure of the travel path network is changed according to time during the schedule period. For example, the travel path network may be changed, for example, because a load is placed on a travel path, someone enters a travel path, the gate of a travel path is closed, new travel paths are added, or travel paths are removed 15 seconds after the start of the schedule period. Even in such cases, according to the present embodiment, routes and travel schedules can be created, which allow moving objects to travel in an efficient way.

Figure 14:
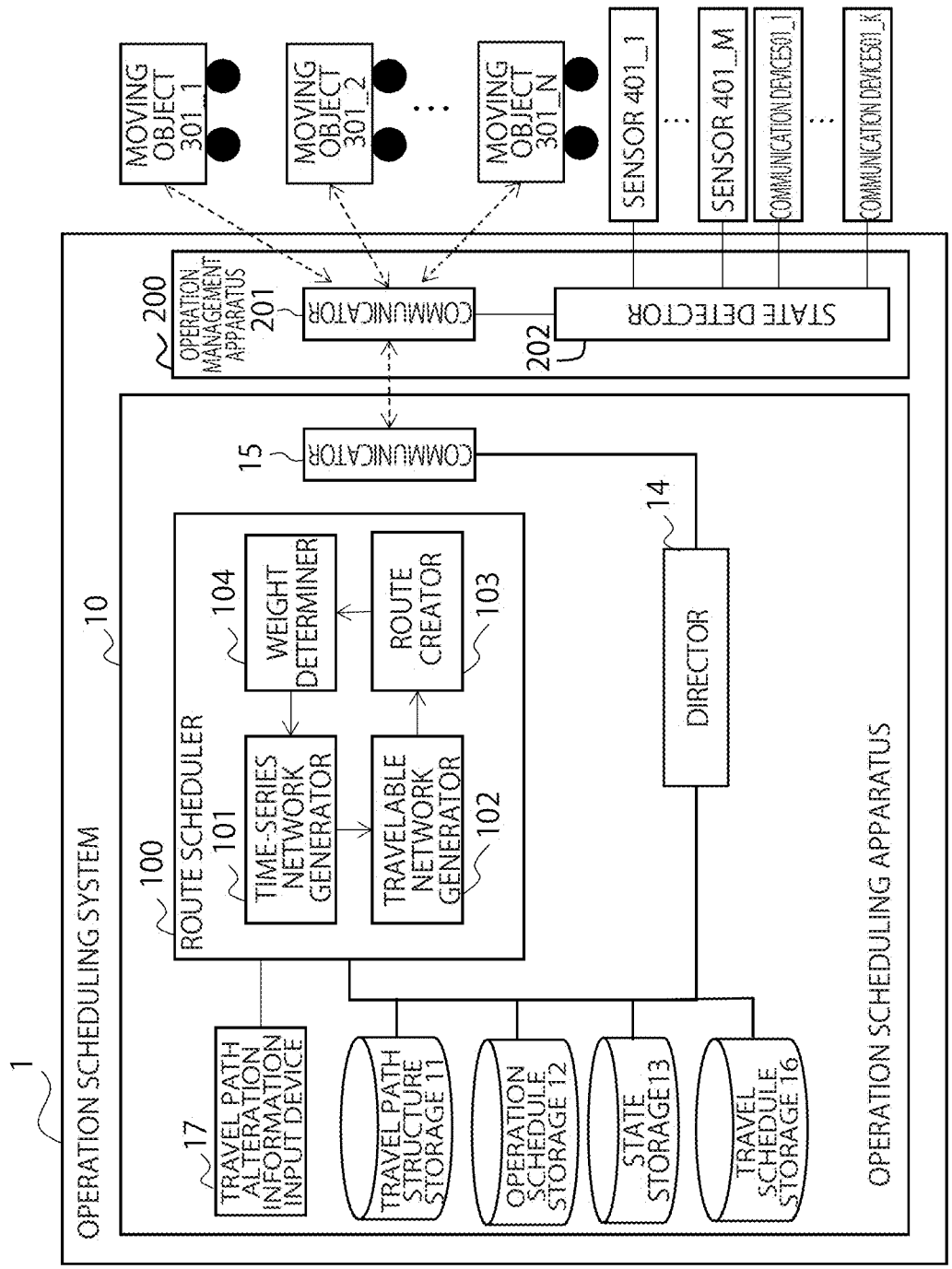
FIG. 14 illustrates an exemplary configuration of an operation scheduling system according to a second embodiment.

FIG. 14 illustrates an exemplary configuration of an operation scheduling system according to the second embodiment. The operation scheduling system includes a travel path alteration information input device 17 in addition to the same components as those of the operation scheduling system in FIG. 1. The travel path alteration information input device 17 receives, as input, information that represents a structure of the travel path network (travel path structure information) and a period in which the structure of the travel path network is used (use period). The travel path alteration information input device 17 may obtain information provided by a user, i.e., an administrator or operator of the system, operating the system, or may receive information from an external device via wired or wireless communication.

Based on the information input from the travel path alteration information input device 17, a travel path structure storage 11 stores a plurality of use periods in association with a plurality of pieces of travel path structure information.

A route scheduler 100 switches the plurality of pieces of travel path structure information so that a piece of travel path structure information will be used, the use time of which conforms to the elapsed time from the schedule start time (i.e., the route scheduler 100 switches travel path networks, based on which weights are calculated for the target moving object). A time-series network generator 101 of the route scheduler 100 generates time-series networks corresponding to respective times in the initial state based on the pieces of travel path structure information according to the use period. The rest of the configuration and operations of the route scheduler 100 are the same as those of the route scheduler 100 in the first embodiment.

Figure 15:
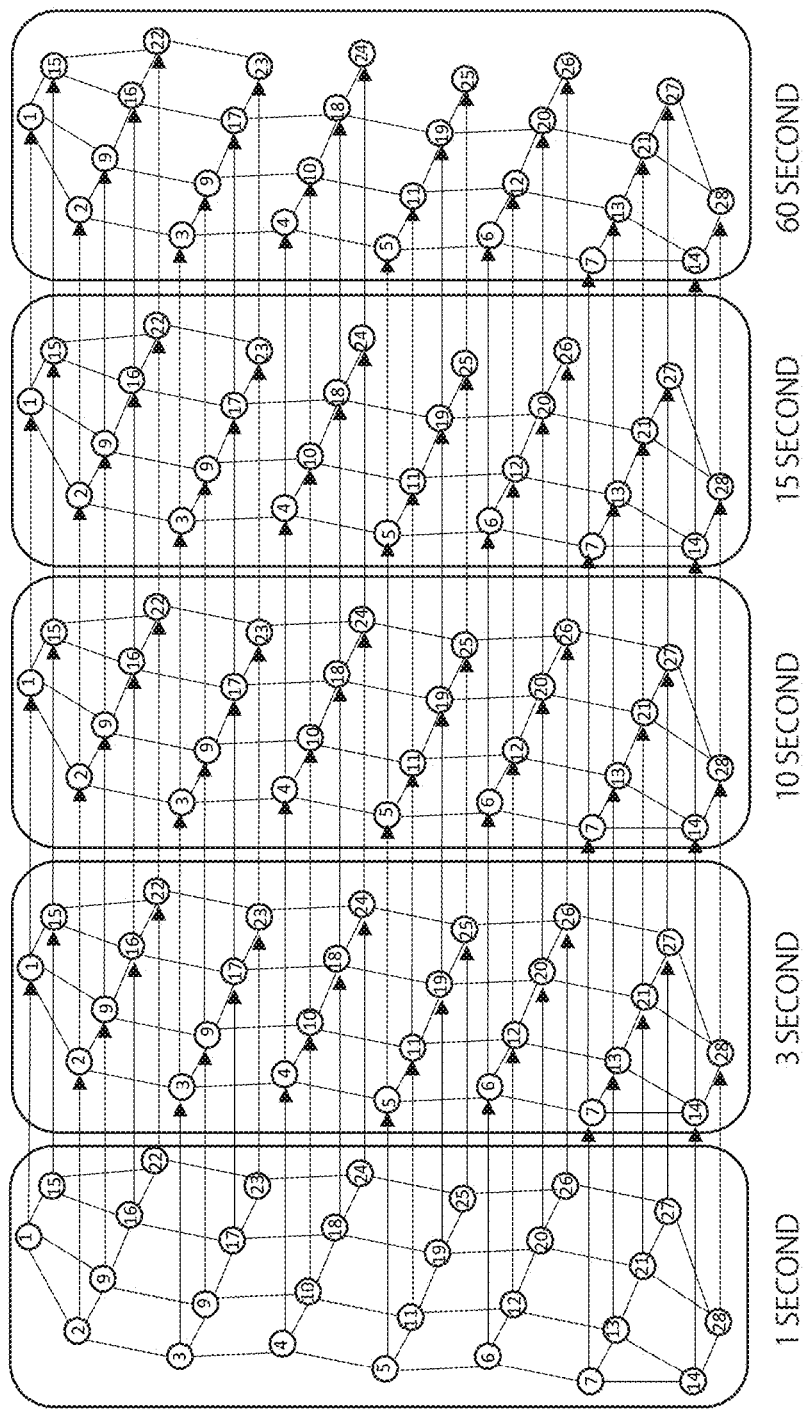
FIG. 15 illustrates exemplary time-series networks corresponding to respective times in the initial state.

FIG. 15 illustrates exemplary time-series networks corresponding to the respective times in the initial state. The time-series networks for the time period from the schedule start time to 15 seconds are the same as those in the first embodiment but the time-series network for the time period from 15 to 60 seconds is different. That is, a travel path structure storage 11 stores two pieces of travel path structure information representing two travel path networks: a piece of travel path structure information representing a travel path network for the time period from the schedule start time to 15 seconds; and a piece of travel path structure information representing a travel path network for the time period from 15 to 60 seconds. At 15 seconds, the travel path networks are switched and accordingly the pieces of travel path structure information are switched. Thus, a new time-series network is generated in the initial state.

In particular, as compared to the time-series network in the initial state for the time period from 10 to 15 seconds, in the time-series network in the initial state for the time period from 15 to 60 seconds, arcs (23, 24), (24, 25) and (25, 26) are removed.

Figure 16:
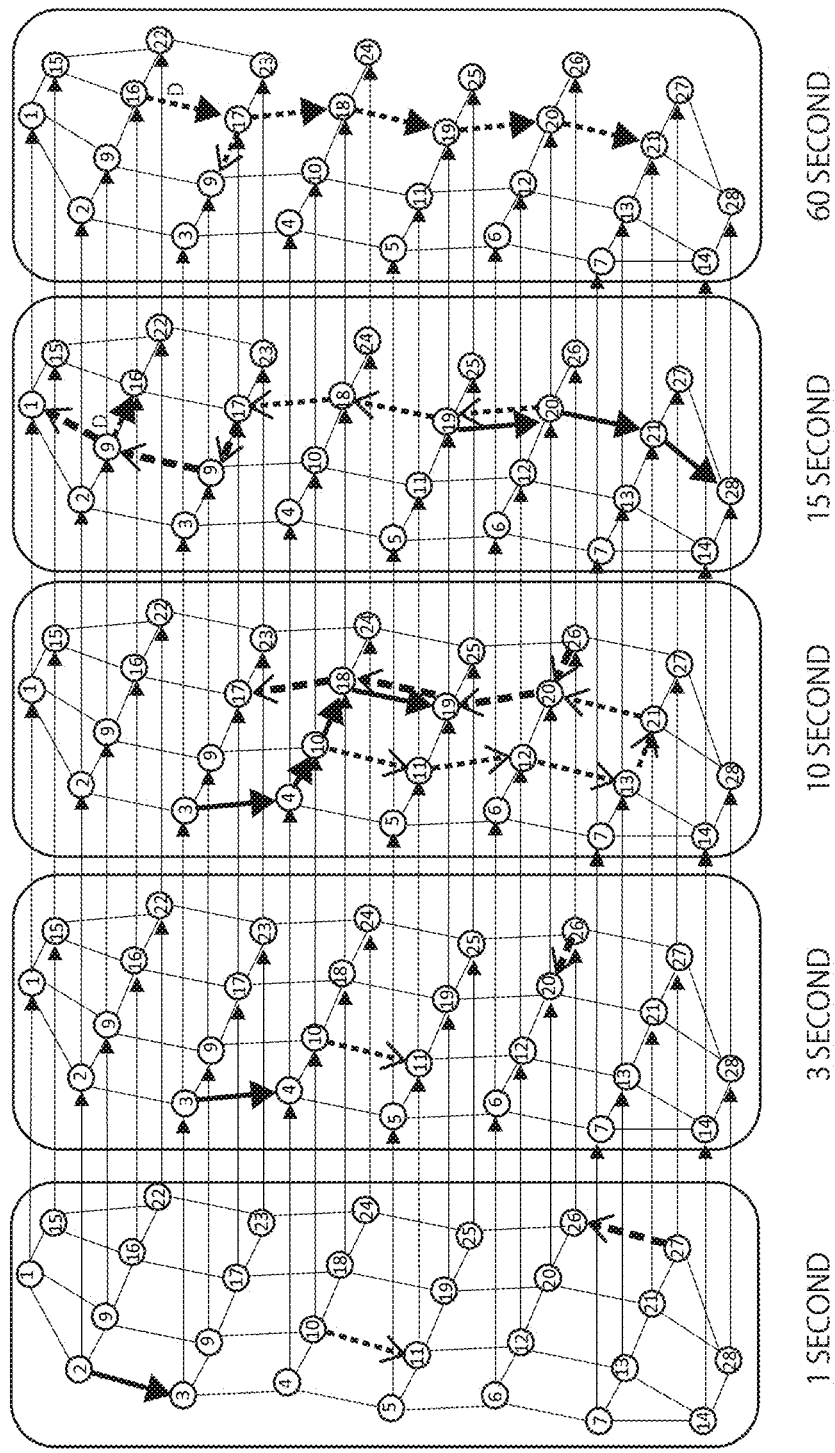
FIG. 16 illustrates a route of the target moving object created based on the time-series networks in FIG. 15.

FIG. 16 illustrates the route of the moving object D created in a manner similar to that in the first embodiment based on the time-series networks in the initial state in FIG. 15. The routes and the travel schedules of the moving objects A-C are created before the route of the moving object D is created. The moving object D is at node 8 from 0 to 10 seconds, travels on arc (9, 16) from 10 to 15 seconds, and travels on arcs (16, 17), (17, 18), (18, 19), (19, 20) and (20, 21) from 15 to 60 seconds. A travel schedule for the moving object D is created by associating the nodes included in the route of the moving object D with the times.

Figure 17:
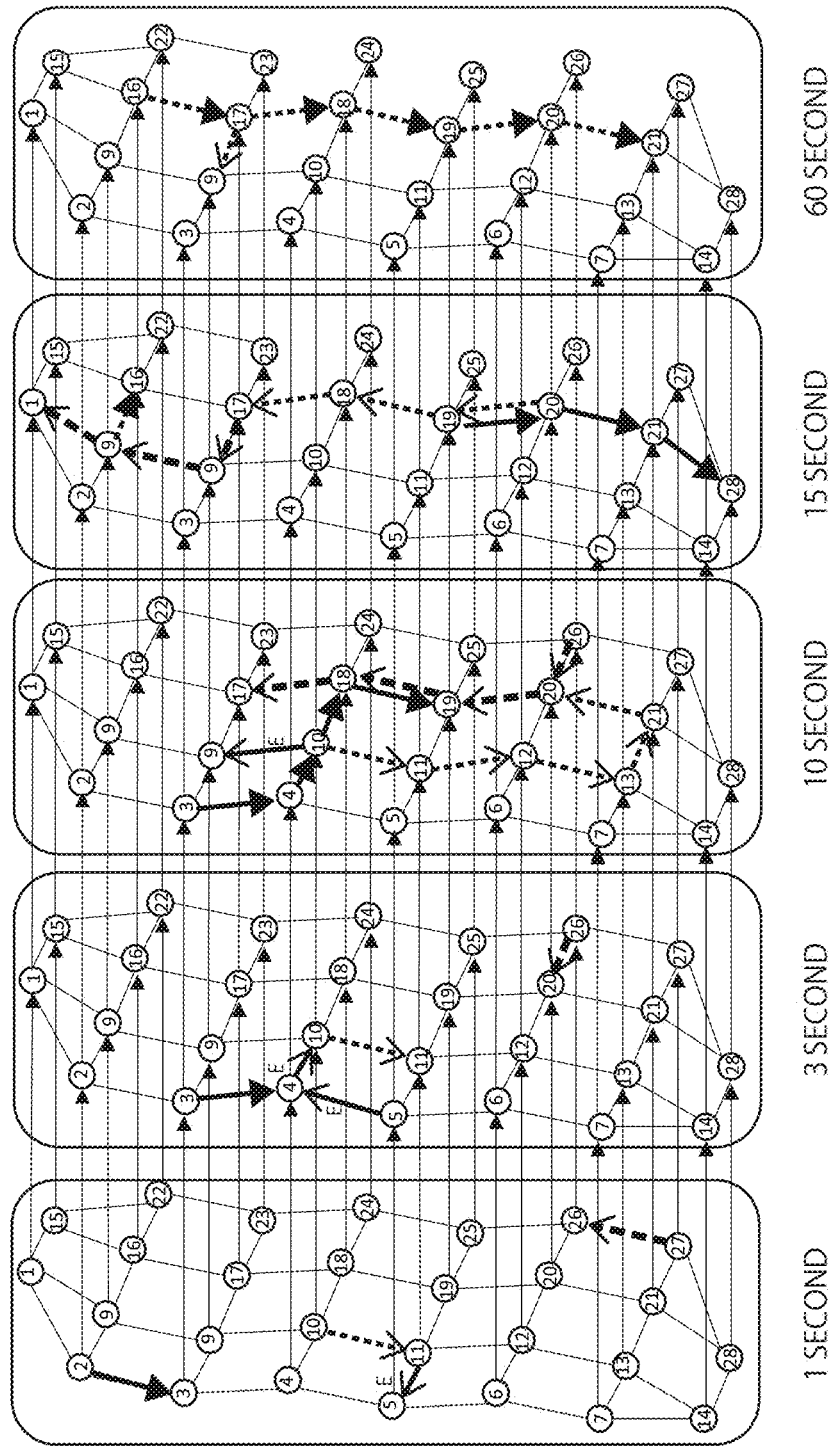
FIG. 17 illustrates the route of the next target moving object created based on the time-series networks in FIG. 15.

FIG. 17 illustrates the route of the moving object E created in a manner similar to that in the first embodiment based on the time-series networks in the initial state in FIG. 15. The route and the travel schedule of the moving object D in FIG. 16 is created before the route of the moving object E is created.

As shown in FIGS. 16 and 17, the created routes do not pass through arcs (23, 24), (24, 25) and (25, 26) in the time period from 15 to 60 seconds.

The schedule period may be divided more finely around 15 seconds. For example, a time-series network for the time period from 14 to 15 seconds, a time-series network for the time period from 15 to 16 seconds and a time-series network for the time period from 16 to 60 seconds may be generated. This makes it possible to create a route that can reduce contention between moving objects more certainly around the time when the travel path networks are switched.

In the present embodiment, a plurality of pieces of travel path structure information are switched according to time. Alternatively, a weight determiner 104 may change the weights of travel paths included in changed portions of the travel path network according to time. Travel paths that become unavailable according to time are given sufficiently large weights and travel paths that become available according to time are given the minimum weight. This can achieve similar effects to those obtained by switching a plurality of pieces of travel path structure information.

According to the present embodiment, routes can be created, which allow moving objects to travel in an efficient way even if the structure of the travel path network changes over time.

Third Embodiment

Figure 18:
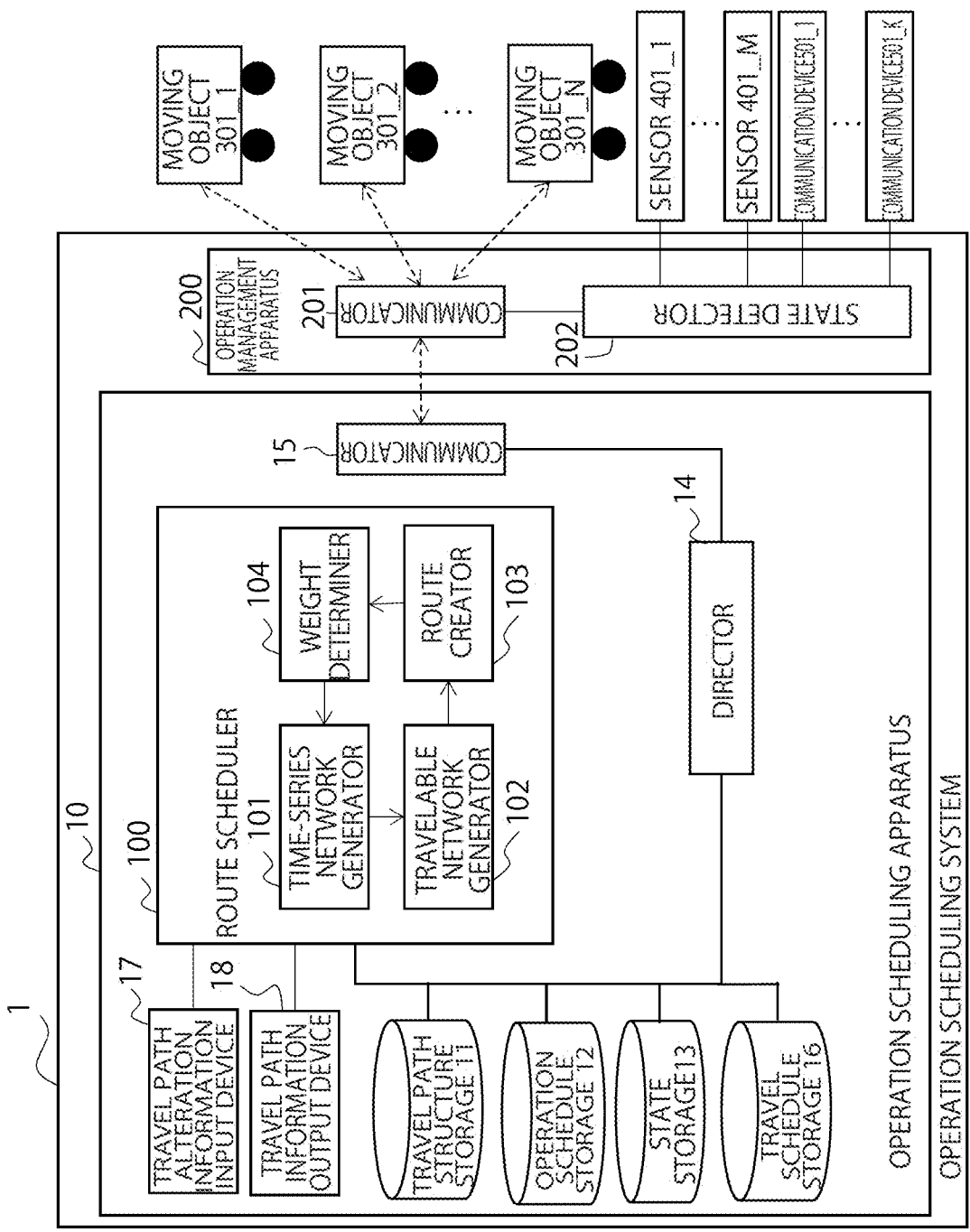
FIG. 18 illustrates an exemplary configuration of an operation scheduling system according to a third embodiment.

FIG. 18 illustrates an exemplary configuration of an operation scheduling system according to a third embodiment. The operation scheduling system includes a travel path information output device 18 (first output device) in addition to the same components as those of the operation scheduling system in FIG. 14. The travel path information output device 18 outputs information including the structure of the travel path network according to time if the structure of the travel path network is changed according to time as in the second embodiment. In particular, the travel path information output device 18 outputs information including time-series networks corresponding to respective times in the initial state (such as the time-series networks corresponding to the respective times in the initial state in FIG. 15) created by a time-series network generator 101.

The output may be provided in a visible form that can be displayed on the screen of a display device viewable to users or workers. The display device may be installed on a wall in the field to be viewed by a large number of users simultaneously. The output information may be transmitted to an external device such as user's terminal via wired or wireless communication.

By displaying the time-series networks corresponding to the respective times in the initial state on a display device, users can easily understand how the travel path network changes. This makes it possible, for example, for users to prevent any moving object but the scheduling target moving object from using a travel path around the time when the travel path is unavailable if the moving object uses the travel path. This also makes it possible for users prevent anyone from walking on a travel path around the time when the travel path is unavailable. A moving object other than the scheduling target moving object may use a travel path, for example, when a worker gets on and manually drives the moving object or when a worker manipulates the moving object by remote control.

Fourth Embodiment

Figure 19:
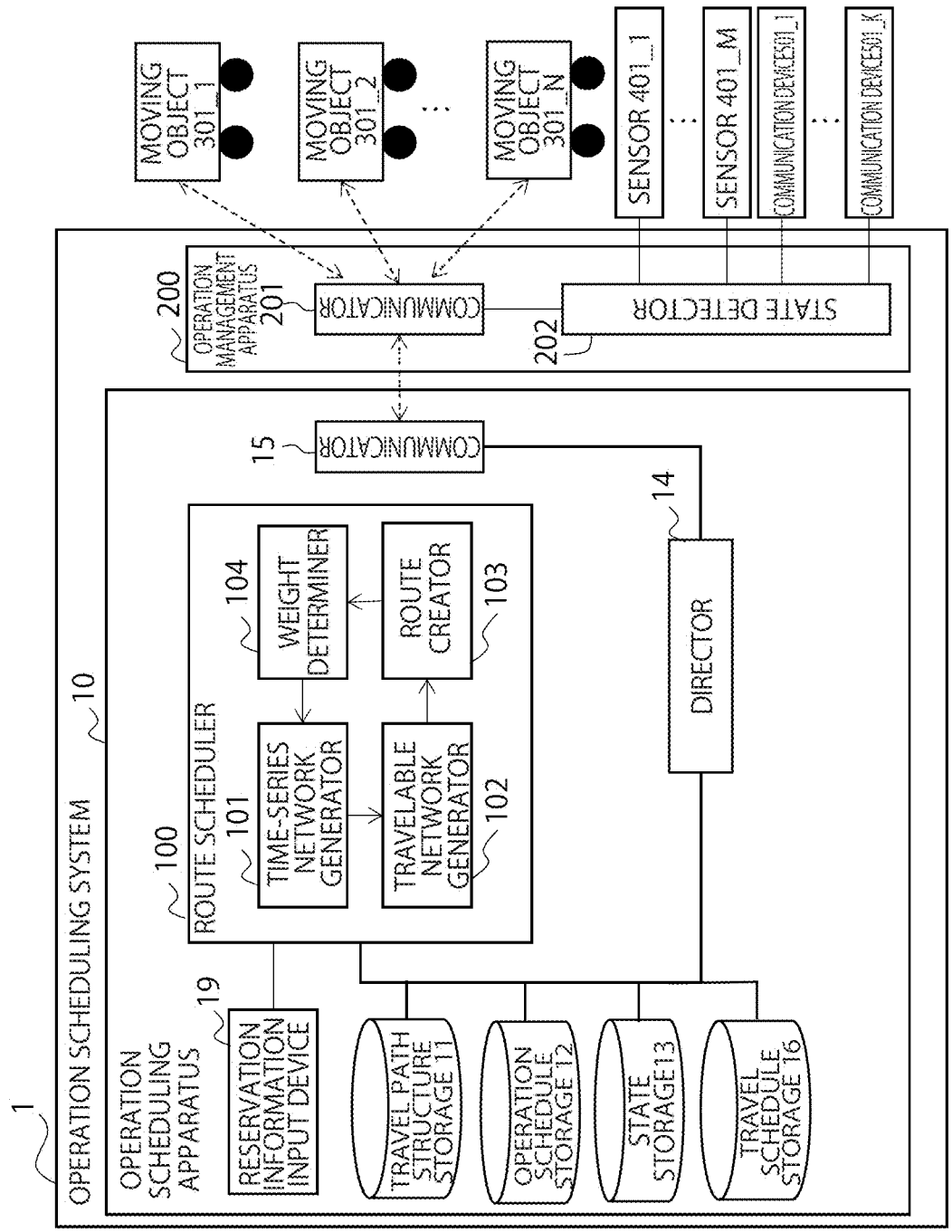
FIG. 19 illustrates an exemplary configuration of an operation scheduling system according to a fourth embodiment.

FIG. 19 illustrates an exemplary configuration of an operation scheduling system according to a fourth embodiment. The operation scheduling system includes a reservation information input device 19 in addition to the same components as those of the operation scheduling system in FIG. 1. The reservation information input device 19 receives, as input, reservation information including information identifying a travel path and a use period in which a moving object other than the scheduling target moving object uses the travel path. The use period may be represented by a set of a start time and an end time or a set of a start time and a time length. A weight determiner 104 may set the weight of the travel path (arc) at the time reserved in the reservation information to a sufficiently large value. That is, the reserved travel path at the reserved time is given a sufficiently large weight because the arc is used by the moving object other than the scheduling target moving object. A moving object other than the scheduling target moving object may use a travel path as described in the third embodiment. The weight of the reserved arc may be determined in a manner similar to that used to set the weights of arcs in the first embodiment.

According to the fourth embodiment, a travel schedule can readily be created for the target moving object, which allow the target moving object to travel in an efficient way even if a moving object other than the scheduling target moving object also uses the travel path network.

Fifth Embodiment

Figure 20:
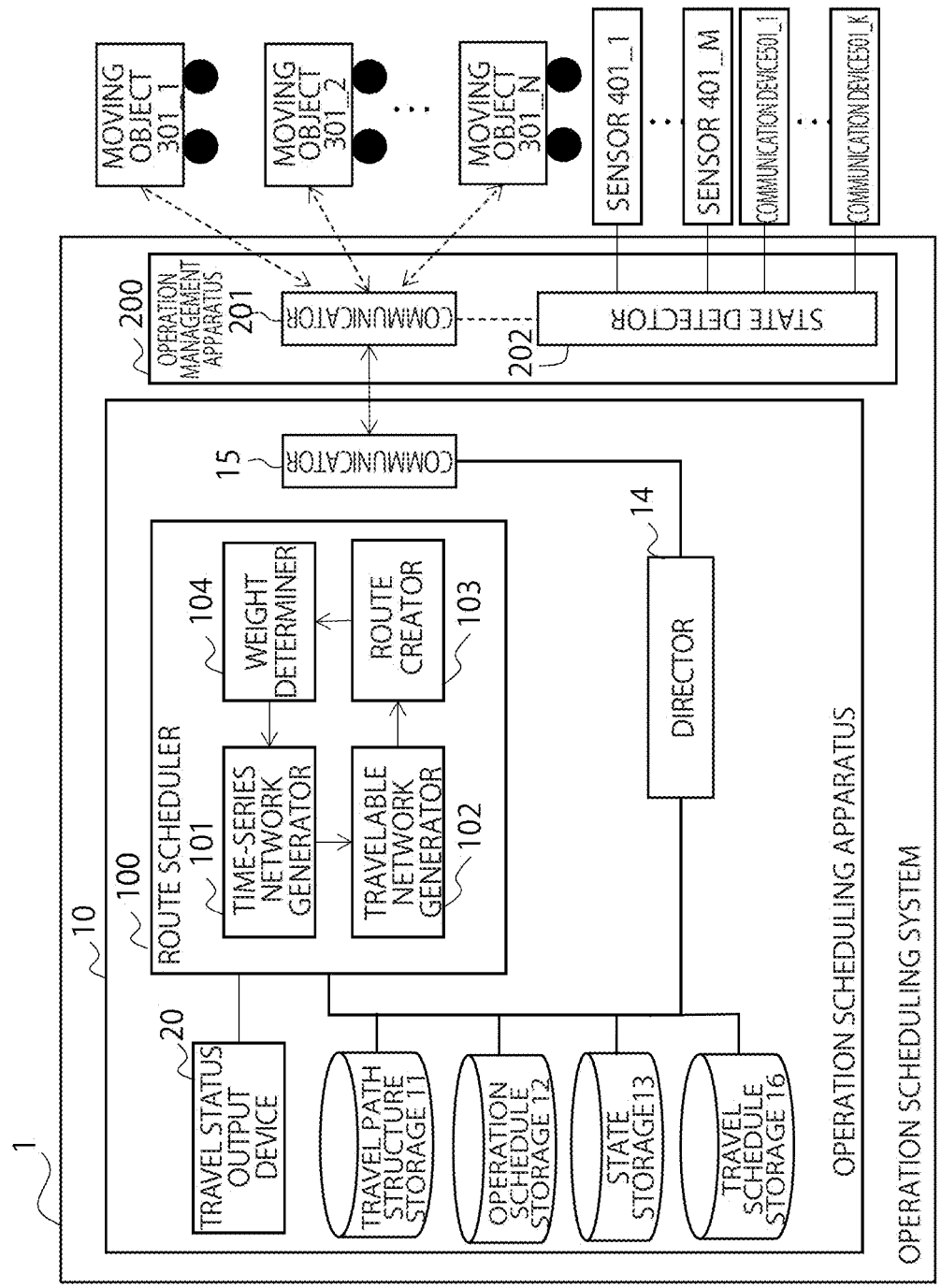
FIG. 20 illustrates an exemplary configuration of an operation scheduling system according to a fifth embodiment.

FIG. 20 illustrates an exemplary configuration of an operation scheduling system according to a fifth embodiment. The operation scheduling system includes a travel status output device 20 (second output device) in addition to the same components as those of the operation scheduling system in FIG. 1. The travel status output device 20 obtains information including time-series networks corresponding to respective times generated by a time-series network generator 101, and outputs the obtained information out of the operation scheduling system.

The time-series network information may be provided in a visible form that can be displayed on the screen of a display device viewable to users or workers. The display device may be installed on a wall in the field to be viewed by a large number of users simultaneously. The time-series network information may be transmitted to an external device such as user's terminal via wired or wireless communication.

The time-series network information may reflect the travel schedules of all the moving objects that a route scheduler 100 processes or the travel schedules of some of those moving objects (e.g., information including time-series networks in the course of processing by the route scheduler 100).

Displaying time-series network information on a display device makes it possible to warn workers to keep away from a travel path around the time when a moving object travels on the travel path. Users can readily understand the travel schedule of each moving object by viewing the time-series network information.

Sixth Embodiment

Figure 21:
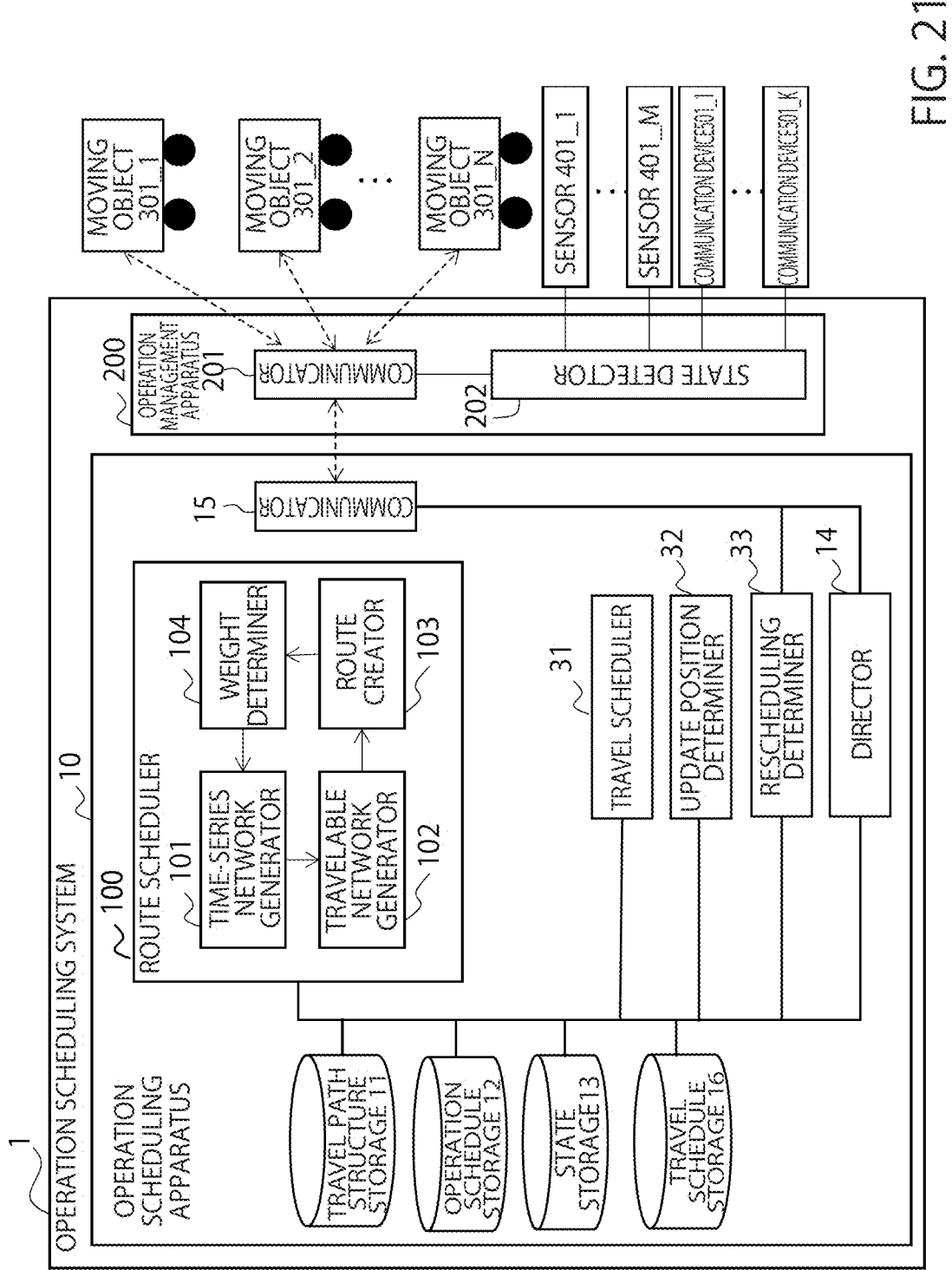
FIG. 21 is a block diagram illustrating an operation scheduling system according to a sixth embodiment.

FIG. 21 is a block diagram of an operation scheduling system according to a sixth embodiment. The operation scheduling system includes a travel scheduler 31, an update position determiner 32 and a rescheduling determiner 33 in addition to the same components as those of the operation scheduling system in FIG. 1. The rescheduling determiner 33 determines whether travel schedules for moving objects created by a route scheduler 100 and stored in a travel schedule storage 16 need to be rescheduled. For example, the rescheduling determiner 33 determines whether contention occurs between the moving objects while the travel schedules are executed. If contention occurs, the rescheduling determiner 33 determines that rescheduling is required. The rescheduling determiner 33 may determine that rescheduling is required if there is a moving object that cannot operate as scheduled (e.g., if there is a moving object that cannot arrive in time for the start of its task) while the travel schedules are executed. The rescheduling determiner 33 may also determine that rescheduling is required if new tasks are assigned to moving objects.

The travel scheduler 31 recreates (updates) the travel schedules of the moving objects if the rescheduling determiner 33 determines that rescheduling is required. In the travel schedules, portions of the routes of the moving objects are updated, which the moving objects have not traveled yet.

The update position determiner 32 determines positions of the moving objects where the travel schedules of the moving objects are updated (update positions). In particular, portions of the routes of the moving objects following the update positions are updated by the travel scheduler 31. If the moving objects can communicate with an operation management apparatus 200 via a communicator 201 in real time, the update positions may be any suitable positions (e.g., the current positions of the moving objects, or positions at some later time to allow a margin for calculation). If the moving objects cannot communicate via the communicator 201, the update positions may be positions where the moving objects can communicate via communication devices 501. The update positions may be any nodes included in the travel path network. The travel scheduler 31 creates routing schedules for the moving objects which begin at the update points of the moving objects.

The travel scheduler 31 may not change portions of the routes of moving objects following the update positions in the current travel schedules. The travel scheduler 31 may determine the routes of moving objects again using the route scheduler 100. The travel scheduler 31 may determine the routes of moving objects again in such way as to reduce the distances the moving objects travel in opposite directions on the same travel path at the same time. The travel scheduler 31 recreate (updates) the travel schedule of each moving object by setting to each node included in portions of the route of the moving object following the update position a timing at which the moving object travels through the node (at least one of the departure time, arrival time and passage time). For example, timings at which the moving objects travel through nodes included in the routes of the moving objects may be determined in such a manner as to prevent contention between the moving objects on travel paths. Timings at which the moving objects travel through nodes may be determined on the assumption that the moving objects travel at constant velocities. Timings at which the moving objects travel through nodes may be determined in any other suitable manners.

The travel scheduler 31 stores the updated travel schedules of the moving objects in the travel schedule storage 16. A director 14 generates instructions for the moving objects based on the updated travel schedules. The director 14 provides the instructions based on the updated travel schedules for the moving objects when the moving objects are at the update points.

As described above, according to the present embodiment, if a possibility of contention arises in the routes of moving objects, routes and travel schedules that do not cause contention between the moving objects can be recreated. For example, if the route scheduler 100 decreases the weights of arcs as time passes, the possibility of contention may rise over time. Even in this case, according to the present embodiment, travel schedules that do not cause contention between moving objects can be recreated.

Figure 22:
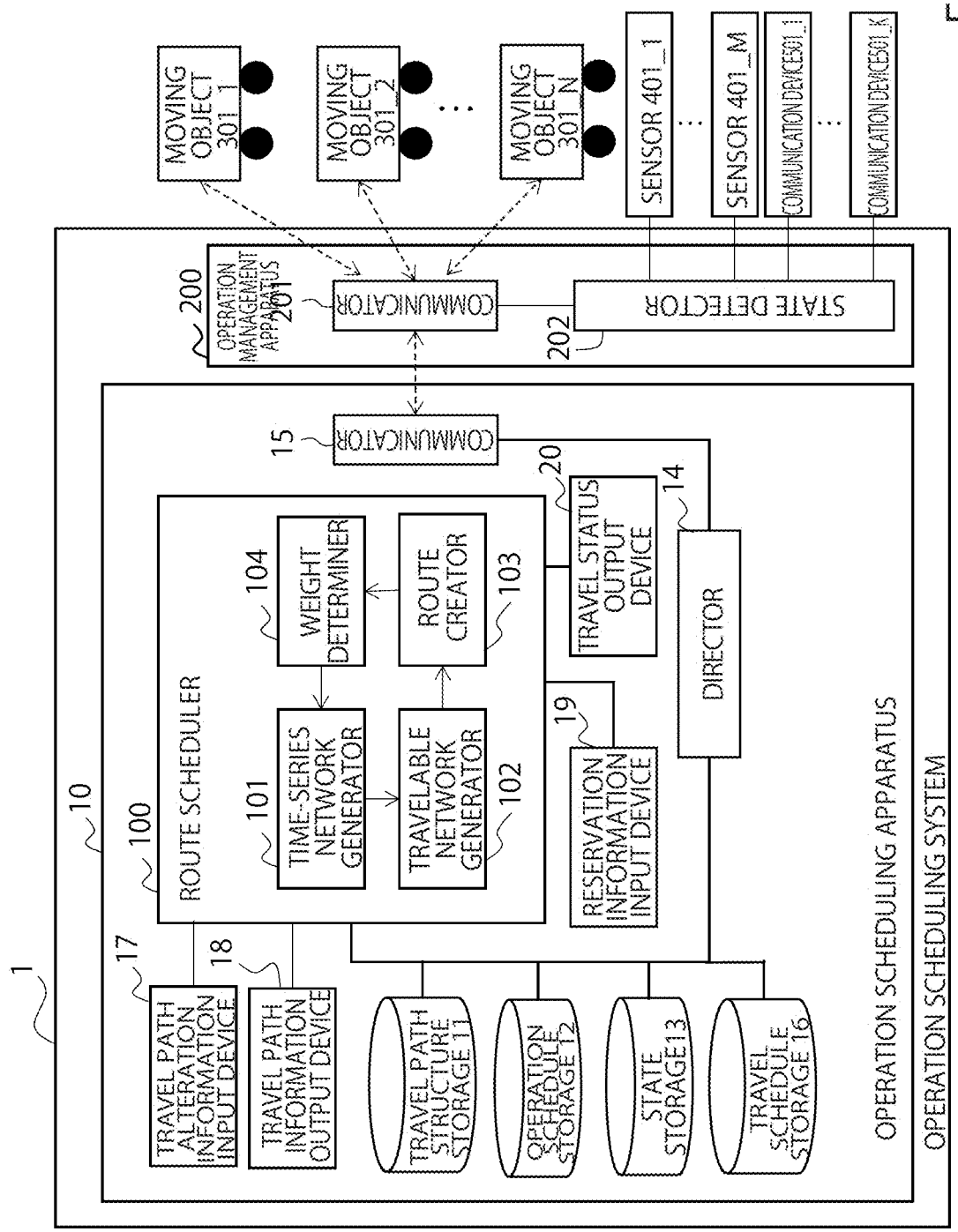
FIG. 22 is a block diagram illustrating an operation scheduling system according to the second to fifth embodiments combined.
Figure 23:
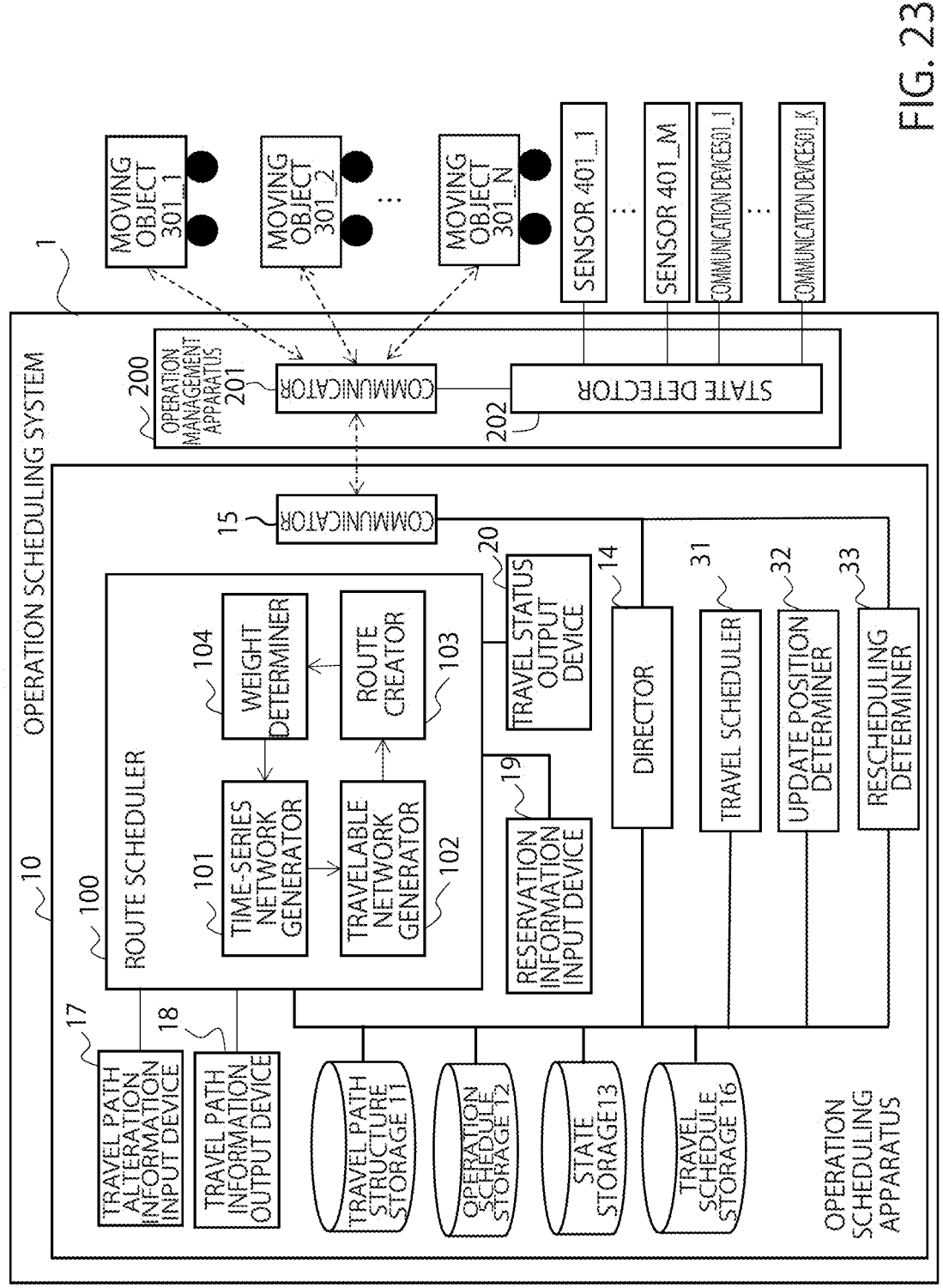
FIG. 23 is a block diagram illustrating an operation scheduling system according to the second to sixth embodiments combined.

Two or more of the first to sixth embodiments may be combined. In this case, the effects of all the combined embodiments can be achieved simultaneously. For example, an operation scheduling system having a configuration shown in FIG. 22 can be obtained by combining the second to fifth embodiments. For another example, an operation scheduling system having a configuration shown in FIG. 23 can be obtained by combining the second to sixth embodiments.

(Hardware Configuration)

Figure 24:
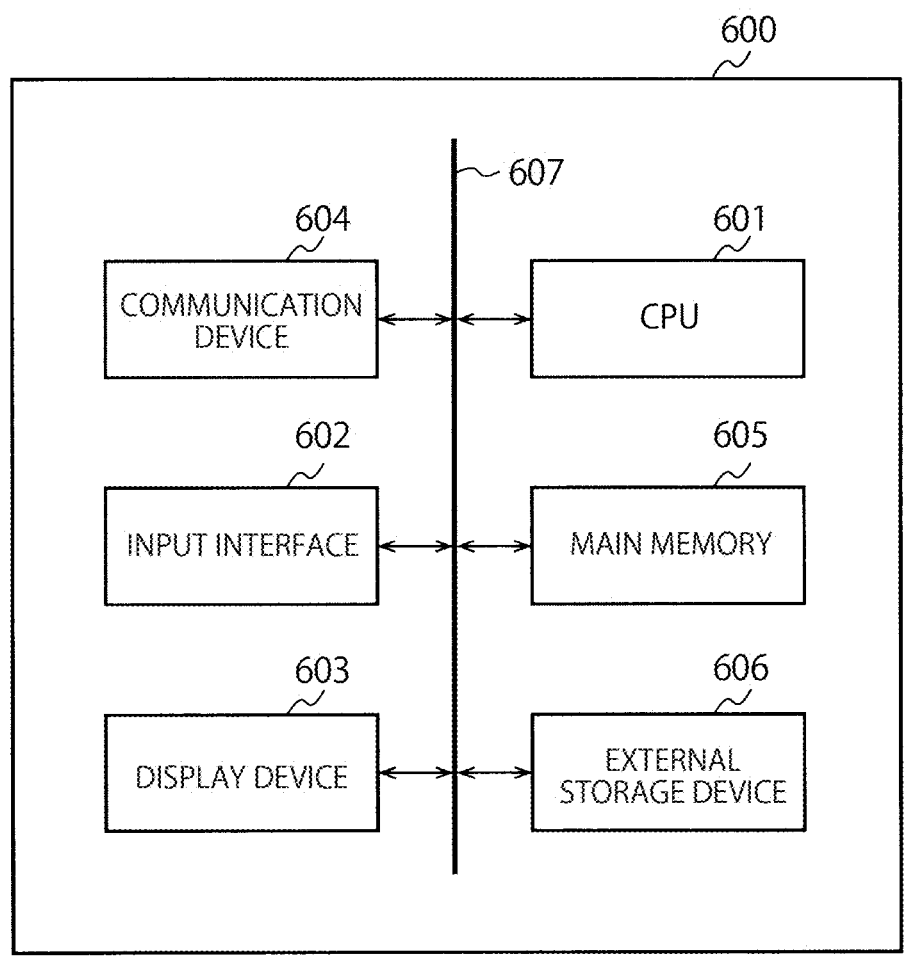
FIG. 24 is a block diagram illustrating the hardware of an information processing apparatus according to the embodiments.

FIG. 24 illustrates a hardware configuration of the prediction apparatus (information processing device) 10 according to the present approach. The information processing device 10 according to the present approach is constructed of a computer apparatus 600. The computer apparatus 600 is provided with a CPU 601, an input interface 602, a display device 603, a communication device 604, a main storage 605 and an external storage device 606, which are mutually connected by a bus 607.

The CPU (central processing unit) 601 executes a computer program for implementing the above-mentioned respective functional components of the information processing device 10 on the main storage 605. The CPU 601 executes the computer program and thereby implements the respective functional components.

The input interface 602 is a circuit for inputting operation signals from the input device such as a keyboard, mouse, and touch panel or the like into the information processing device 10. The input interface 602 corresponds to an input device.

The display device 603 displays data or information outputted from the information processing device 10. The display device 603 is, for example, an LCD (Liquid Crystal Display), a CRT (Cathode Ray Tube), and a PDP (plasma display), but the display device 603 is not limited thereto. The data or information outputted from computer apparatus 600 can be displayed by this display device 603. The display device 603 corresponds to an output device.

The communication device 604 is a circuit for the information processing device 10 to communicate with the external device by wireless or wired means. Information can be inputted from the external device via the communication device 604. The information inputted from the external device can be stored in the DB. The input device 120 or the output device 130 that carries out the communication function can be constructed on the communication device 604.

The main storage 605 stores a program that implements processing of the present approach, data necessary to execute the program and data generated by executing the program. The program is developed and executed on the main storage 605. The main storage 605 may be, for example, RAM, DRAM or SRAM, but it is not limited to this. The various DBs and the storage in each approach may be constructed on the main storage 605.

The external storage device 606 stores the above-described program and data necessary to execute the program, data generated by executing the program or the like. The program and data are read into the main storage 605 during processing of the present approach. The external storage device 606 is, for example, a hard disk, an optical disk, a flash memory or a magnetic tape, but it is not limited to this. The various DBs and the storage in each approach may be constructed on the external storage device 606.

Note that the above-described program may be preinstalled in the computer apparatus 600 or may be stored in a storage medium such as a CD-ROM. The program may be uploaded on the Internet.

Note that the computer apparatus 600 may be provided with one or a plurality of processors 601, input interfaces 602, display devices 603, communication devices 604 and main storages 605, and peripheral devices such as a printer and a scanner may be connected thereto.

In addition, the information processing device 10 may be constructed of the single computer apparatus 600 or may be configured as a system composed of a plurality of mutually connected computer apparatuses 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
a communication circuitry configured for wired or wireless communication with a first moving object and a second moving object that can travel on a travel path network including a plurality of travel paths;
a processing circuitry configured to:
divide a target planning period into a plurality of time periods, and manage a plurality of weight data including weights of travel paths independently for the plurality of time periods, wherein the weight data for each of the plurality of time periods has a predetermined minimum value as an initial weight for each the travel paths in the travel path network, and the weight data for each of the plurality of time periods can have different weights for each of the travel paths, a length of a later time period of the plurality of time periods is longer than a length of an earlier time period of the plurality of time periods,
determine travel paths to be passed through by the first moving object in each of the plurality of time periods and timing for passing through the travel paths before the target planning period starts based on a departure time, a departure point and an arrival point of the first moving object and an assumed travel velocity of the first moving object to thereby generate a first travel schedule in which the first moving object travels from the departure point to the arrival point in the target planning period, wherein the processing circuitry calculates a function relating to a sum of the weights set for the travel paths traveled in each of the plurality of time periods for the first moving object, and minimizes or subminimizes an output value of the function to thereby determine the travel paths that the first moving object travels in each of the plurality of time periods, the weights set for the travel paths traveled in each of the plurality of time periods for the first moving object being obtained from the weight data corresponding to the time period in which each of the travel paths is traveled among the plurality of time periods,
perform an updating process which
specifies the travel paths on which the first moving object travels in each of the plurality of time periods based on the first travel schedule,
identifies the weight data corresponding to the time period in which each of the specified travel paths is to be traveled, and updates a weight of the specified travel path in the identified weight data only to a larger value than the predetermined minimum value, wherein the larger value is a value larger than a maximum value of the output value of the function, and after the first travel schedule is generated and before the target planning period starts, determine travel paths to be passed through by the second moving object in each of the plurality of time periods and timing for passing through the travel paths based on a departure time, a departure point and an arrival point of the second moving object and an assumed travel velocity of the second moving object to thereby generate a second travel schedule in which the second moving object travels from the departure point to the arrival point in the target planning period, wherein the processing circuitry calculates the function relating to a sum of the weights set for the travel paths traveled in each of the plurality of time periods for the second moving object, the weights having the predetermined minimum value or the larger value, and minimizes or subminimizes an output value of the function to thereby determine the travel paths that the second moving object travels in each of the plurality of time periods, the weights set for the travel paths traveled in each of the plurality of time periods for the second moving object being obtained from the weight data after the update process, which corresponds to the time period in which each of the travel paths is traveled among the plurality of time periods; and a control circuitry configured to generate first instruction data and second instruction data that instruct traveling of the first moving object and the second moving object according to the first travel schedule and the second travel schedule and transmit the first instruction data and the second instruction data from the communication circuitry to the first moving object and the second moving object to control traveling of the first moving object and the second moving object, wherein after the target planning period starts, the first moving object is controlled to travel according to the first travel schedule, and the second moving object is controlled to travel according to the second travel schedule.

2. The information processing apparatus according to claim 1, wherein the information processing apparatus further comprises a display configured to display to a user, first information including travel paths on which the first moving object travels for each of the plurality of time periods so that the user can see whether the first moving object travels the travel paths in the travel path network for each of the plurality of time periods.

3. The information processing apparatus according to claim 1, wherein the information processing apparatus further comprises an input circuitry configured to receive a plurality of structure information indicating a structure of the travel path network in association with a plurality of used periods during which the travel path network of the structure is used wherein the structure of the travel path network is planned to change due to addition of a travel path and/or deletion of the travel path into/from the travel path network, the processing circuitry specifies the travel path network of the structure corresponding to the used period in which each of the plurality of time periods is included, and determines the travel paths to be passed through by the first moving object in each of the plurality of time periods, using the specified travel path network.

4. The information processing apparatus according to claim 3, wherein the addition of a travel path is done by making the weight of the travel path smaller and the deletion of a travel path is done by making the weight of the travel path larger.

5. The information processing apparatus according to claim 4, wherein the information processing apparatus further comprises a display configured to display information to a user that maps the used period and the structure of the travel path network for the pairs, so that the user can see how the structure of the travel network changes with a time.

6. The information processing apparatus according to claim 1, wherein before generating the second travel schedule, the processing circuitry is further configured to acquire reservation information for use of the travel paths for a third moving object for each of the time periods and set the weights valid only for each of the time periods for the travel paths that are reserved by the third moving object for each of the time periods.

7. An information processing method comprising:

communicating by wireless or wired communication with a first moving object and a second moving object that can travel on a travel path network including a plurality of travel paths;

dividing a target planning period into a plurality of time periods, and managing a plurality of weight data including weights of travel paths independently for the plurality of time periods, wherein the weight data for each of the plurality of time periods has a predetermined minimum value as an initial weight for each the travel paths in the travel path network, and the weight data for each of the plurality of time periods can have different weights for each of the travel paths, a length of a later time period of the plurality of time periods is longer than a length of an earlier time period of the plurality of time periods;

determining travel paths to be passed through by the first moving object in each of the plurality of time periods and timing for passing through the travel paths before the target planning period starts based on a departure time, a departure point and an arrival point of the first moving object and an assumed travel velocity of the first moving object to thereby generate a first travel schedule in which the first moving object travels from the departure point to the arrival point in the target planning period, wherein determining travel paths to be passed through by the first moving object includes calculating a function relating to a sum of the weights set for the travel paths traveled in each of the plurality of time periods for the first moving object, and minimizing or subminimizing an output value of the function to thereby determine the travel paths that the first moving object travels in each of the plurality of time periods, the weights set for the travel paths traveled in each of the plurality of time periods for the first moving object being obtained from the weight data corresponding to the time period in which each of the travel paths is traveled among the plurality of time periods;

performing an updating process which
specifies the travel paths on which the first moving object travels in each of the plurality of time periods based on the first travel schedule,
identifies the weight data corresponding to the time period in which each of the specified travel paths is to be traveled, and
updates a weight of the specified travel path in the identified weight data only to a larger value than the predetermined minimum value, wherein the larger value is a value larger than a maximum value of the output value of the function;
after the first travel schedule is generated and before the target planning period starts, determining travel paths to be passed through by the second moving object in each of the plurality of time periods and timing for passing through the travel paths based on a departure time, a departure point and an arrival point of the second moving object and an assumed travel velocity of the second moving object to thereby generate a second travel schedule in which the second moving object travels from the departure point to the arrival point in the target planning period, wherein determining travel paths to be passed through by the second moving object includes calculating the function relating to a sum of the weights set for the travel paths traveled in each of the plurality of time periods for the second moving object, the weights having the predetermined minimum value or the larger value, and minimizing or subminimizing an output value of the function to thereby determine the travel paths that the second moving object travels in each of the plurality of time periods, the weights set for the travel paths traveled in each of the plurality of time periods for the second moving object being obtained from the weight data after the update process, which corresponds to the time period in which each of the travel paths is traveled among the plurality of time periods;
generating first instruction data and second instruction data that instruct traveling of the first moving object and the second moving object according to the first travel schedule and the second travel schedule, and transmitting the first instruction data and the second instruction data from the communication circuitry to the first moving object and the second moving object to control traveling of the first moving object and the second moving object; and
after the target planning period starts, controlling the first moving object to travel according to the first travel schedule, and controlling the second moving object to travel according to the second travel schedule.

8. A non-transitory computer readable medium having a computer program stored therein which causes a computer to perform processes comprising:
communicating by wireless or wired communication with a first moving object and a second moving object that can travel on a travel path network including a plurality of travel paths;
dividing a target planning period into a plurality of time periods, and managing a plurality of weight data including weights of travel paths independently for the plurality of time periods, wherein the weight data for each of the plurality of time periods has a predetermined minimum value as an initial weight for each of the travel paths in the travel path network, and the weight data for each of the plurality of time periods can have different weights for each of the travel paths, a length of a later time period of the plurality of time periods is longer than a length of an earlier time period of the plurality of time periods;
determining travel paths to be passed through by the first moving object in each of the plurality of time periods and timing for passing through the travel paths before the target planning period starts based on a departure time, a departure point and an arrival point of the first moving object and an assumed travel velocity of the first moving object to thereby generate a first travel schedule in which the first moving object travels from the departure point to the arrival point in the target planning period, wherein determining travel paths to be passed through by the first moving object includes calculating a function relating to a sum of the weights set for the travel paths traveled in each of the plurality of time periods for the first moving object, and minimizing or subminimizing an output value of the function to thereby determine the travel paths that the first moving object travels in each of the plurality of time periods, the weights set for the travel paths traveled in each of the plurality of time periods for the first moving object being obtained from the weight data corresponding to the time period in which each of the travel paths is traveled among the plurality of time periods;
performing an updating process which
specifies the travel paths on which the first moving object travels in each of the plurality of time periods based on the first travel schedule,
identifies the weight data corresponding to the time period in which each of the specified travel paths is to be traveled, and
updates a weight of the specified travel path in the identified weight data only to a larger value than the predetermined minimum value, wherein the larger value is a value larger than a maximum value of the output value of the function;
after the first travel schedule is generated and before the target planning period starts, determining travel paths to be passed through by the second moving object in each of the plurality of time periods and timing for passing through the travel paths based on a departure time, a departure point and an arrival point of the second moving object and an assumed travel velocity of the second moving object to thereby generate a second travel schedule in which the second moving object travels from the departure point to the arrival point in the target planning period, wherein determining travel paths to be passed through by the second moving object includes calculating the function relating to a sum of the weights set for the travel paths traveled in each of the plurality of time periods for the second moving object, the weights having the predetermined minimum value or the larger value, and minimizing or subminimizing an output value of the function to thereby determine the travel paths that the second moving object travels in each of the plurality of time periods, the weights set for the travel paths traveled in each of the plurality of time periods for the second moving object being obtained from the weight data after the update process, which corresponds to the time period in which each of the travel paths is traveled among the plurality of time periods;
generating first instruction data and second instruction data that instruct traveling of the first moving object and the second moving object according to the first travel schedule and the second travel schedule, and transmitting the first instruction data and the second instruction data to the first moving object and the second moving object to control traveling of the first moving object and the second moving object; and after the target planning period starts, controlling the first moving object to travel according to the first travel schedule, and controlling the second moving object to travel according to the second travel schedule.

9. An information processing system comprising:

a first moving object;

a second moving object; and an information processing apparatus comprising:
- a communication circuitry configured for wired or wireless communication with the first moving object and the second moving object that can travel on a travel path network including a plurality of travel paths;
- a processing circuitry configured to:
  - divide a target planning period into a plurality of time periods, and manage a plurality of weight data including weights of travel paths independently for the plurality of time periods, wherein the weight data for each of the plurality of time periods has a predetermined minimum value as an initial weight for each the travel paths in the travel path network, and the weight data for each of the plurality of time periods can have different weights for each of the travel paths, a length of a later time period of the plurality of time periods is longer than a length of an earlier time period of the plurality of time periods,
  - determine travel paths to be passed through by the first moving object in each of the plurality of time periods and timing for passing through the travel paths before the target planning period starts based on a departure time, a departure point and an arrival point of the first moving object and an assumed travel velocity of the first moving object to thereby generate a first travel schedule in which the first moving object travels from the departure point to the arrival point in the target planning period, wherein the processing circuitry calculates a function relating to a sum of the weights set for the travel paths traveled in each of the plurality of time periods for the first moving object, and minimizes or subminimizes an output value of the function to thereby determine the travel paths that the first moving object travels in each of the plurality of time periods, the weights set for the travel paths traveled in each of the plurality of time periods for the first moving object being obtained from the weight data corresponding to the time period in which each of the travel paths is traveled among the plurality of time periods,
  - perform an updating process which specifies the travel paths on which the first moving object travels in each of the plurality of time periods based on the first travel schedule,
    - identifies the weight data corresponding to the time period in which each of the specified travel paths is to be traveled, and
    - updates a weight of the specified travel path in the identified weight data only to a larger value than the predetermined minimum value, wherein the larger value is a value larger than a maximum value of the output value of the function,
  - after the first travel schedule is generated and before the target planning period starts, determine travel paths to be passed through by the second moving object in each of the plurality of time periods and timing for passing through the travel paths based on a departure time, a departure point and an arrival point of the second moving object and an assumed travel velocity of the second moving object to thereby generate a second travel schedule in which the second moving object travels from the departure point to the arrival point in the target planning period, wherein the processing circuitry calculates the function relating to a sum of the weights set for the travel paths traveled in each of the plurality of time periods for the second moving object, the weights having the predetermined minimum value or the larger value, and minimizes or subminimizes an output value of the function to thereby determine the travel paths that the second moving object travels in each of the plurality of time periods, the weights set for the travel paths traveled in each of the plurality of time periods for the second moving object being obtained from the weight data after the update process, which corresponds to the time period in which each of the travel paths is traveled among the plurality of time periods; and
- a control circuitry configured to generate first instruction data and second instruction data that instruct traveling of the first moving object and the second moving object according to the first travel schedule and the second travel schedule and transmit the first instruction data and the second instruction data from the communication circuitry to the first moving object and the second moving object to control traveling of the first moving object and the second moving object, wherein after the target planning period starts, the first moving object is controlled to travel according to the first travel schedule, and the second moving object is controlled to travel according to the second travel schedule.

* * * * *